United States Patent
Ueda et al.

(10) Patent No.: US 9,631,613 B2
(45) Date of Patent: Apr. 25, 2017

(54) HYDRAULIC DRIVE DEVICE FOR CARGO HANDLING VEHICLE

(71) Applicant: KABUSHIKI KAISHA TOYOTA JIDOSHOKKI, Kariya-shi, Aichi (JP)

(72) Inventors: Yuki Ueda, Kariya (JP); Tsutomo Matsuo, Kariya (JP); Takashi Uno, Kariya (JP); Hirohiko Ishikawa, Kariya (JP); Naoya Yokomachi, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 364 days.

(21) Appl. No.: 14/304,229

(22) Filed: Jun. 13, 2014

(65) Prior Publication Data

US 2014/0369866 A1    Dec. 18, 2014

(30) Foreign Application Priority Data

Jun. 17, 2013 (JP) ................................ 2013-126757
Mar. 4, 2014 (JP) ................................ 2014-041716

(51) Int. Cl.
| | | |
|---|---|---|
| *F04B 35/04* | (2006.01) | |
| *B66F 9/22* | (2006.01) | |
| *F15B 21/14* | (2006.01) | |

(52) U.S. Cl.
CPC .............. *F04B 35/045* (2013.01); *B66F 9/22* (2013.01); *F15B 21/14* (2013.01);
(Continued)

(58) Field of Classification Search
CPC ...... F04B 2201/1202; F04B 2201/1203; F15B 2011/0246
See application file for complete search history.

(56) References Cited

U.S. PATENT DOCUMENTS

| | | | | |
|---|---|---|---|---|
| 5,505,043 A | * | 4/1996 | Baginski | ................... B66F 9/20 60/477 |
| 5,649,422 A | | 7/1997 | Baginski et al. | |
| 2010/0021313 A1 | * | 1/2010 | Devan | ..................... F04B 17/03 417/44.1 |

FOREIGN PATENT DOCUMENTS

| | | |
|---|---|---|
| DE | 102011056069 A1 | 6/2013 |
| GB | 2360757 A | 10/2001 |
| JP | 2-231398 A | 9/1990 |

OTHER PUBLICATIONS

Communication dated Nov. 28, 2014 from the European Patent Office in counterpart application No. 14172280.1.

* cited by examiner

*Primary Examiner* — Eric Keasel
*Assistant Examiner* — Matthew Wiblin
(74) *Attorney, Agent, or Firm* — Sughrue Mion, PLLC

(57) ABSTRACT

A hydraulic drive device for cargo handling vehicle has: a tank; a pump for drawing in a hydraulic oil from the tank and supplying the hydraulic oil to hydraulic cylinders; an electric motor for driving the pump; a solenoid-controlled proportional valve disposed between an inlet port of the pump and a bottom chamber of an up-and-down hydraulic cylinder and configured to open with a valve travel depending upon a control input of a descent control of an up-and-down control member; a pressure compensation valve disposed between a branch portion located between the pump and the solenoid-controlled proportional valve and the tank and configured to open with a valve travel depending upon a pressure difference between pressures upstream and downstream of the solenoid-controlled proportional valve; and a valve disposed between the pressure compensation valve and the tank and configured to be switched between an open position and a close position.

7 Claims, 21 Drawing Sheets

(52) U.S. Cl.
CPC .  *B60L 2200/42* (2013.01); *F15B 2211/20515* (2013.01); *F15B 2211/20538* (2013.01); *F15B 2211/20569* (2013.01); *F15B 2211/30595* (2013.01); *F15B 2211/40569* (2013.01); *F15B 2211/4159* (2013.01); *F15B 2211/41572* (2013.01); *F15B 2211/50536* (2013.01); *F15B 2211/7142* (2013.01); *F15B 2211/88* (2013.01)

Fig.5

| CONTROL CONDITION | CONTROL ITEMS | | |
|---|---|---|---|
| LEVER CONTROL STEERING CONTROL | POWER DRIVE TORQUE LIMIT | MOTOR ROTATION RATE COMMAND VALUE | BYPASS SOLENOID-CONTROLLED DIRECTIONAL CONTROL VALVE |
| DESCENT | ON | N_lift | ON or OFF |
| DESCENT + TILT | OFF | N_tilt | ON |
| DESCENT + ATTACHMENT | OFF | N_atmt | ON |
| DESCENT + PS | OFF | N_ps | ON |
| DESCENT + TILT + PS | OFF | MAXIMUM OF N_tilt AND N_ps | ON |

Fig. 13

| CONTROL CONDITION | | | CONTROL ITEMS | | |
|---|---|---|---|---|---|
| DIRECTION SENSOR | LEVER CONTROL STEERING CONTROL | POWER DRIVE TORQUE LIMIT | MOTOR ROTATION RATE COMMAND VALUE | BYPASS SOLENOID-CONTROLLED DIRECTIONAL CONTROL VALVE | |
| OFF | DESCENT | ON | N_lift | ON or OFF | |
| | DESCENT + TILT | OFF | N_tilt | ON | |
| | DESCENT + PS | OFF | N_ps | ON | |
| | DESCENT + TILT + PS | OFF | MAXIMUM OF N_tilt AND N_ps | ON | |
| ON | DESCENT | TWO-VALUED CONTROL OF POWER DRIVE TORQUE LIMIT VALUE | MAXIMUM OF N_tilt AND N_ps | ON or OFF | |
| | DESCENT + TILT | OFF | N_tilt | ON | |
| | DESCENT + PS | OFF | N_ps | ON | |
| | DESCENT + TILT + PS | OFF | MAXIMUM OF N_tilt AND N_ps | ON | |

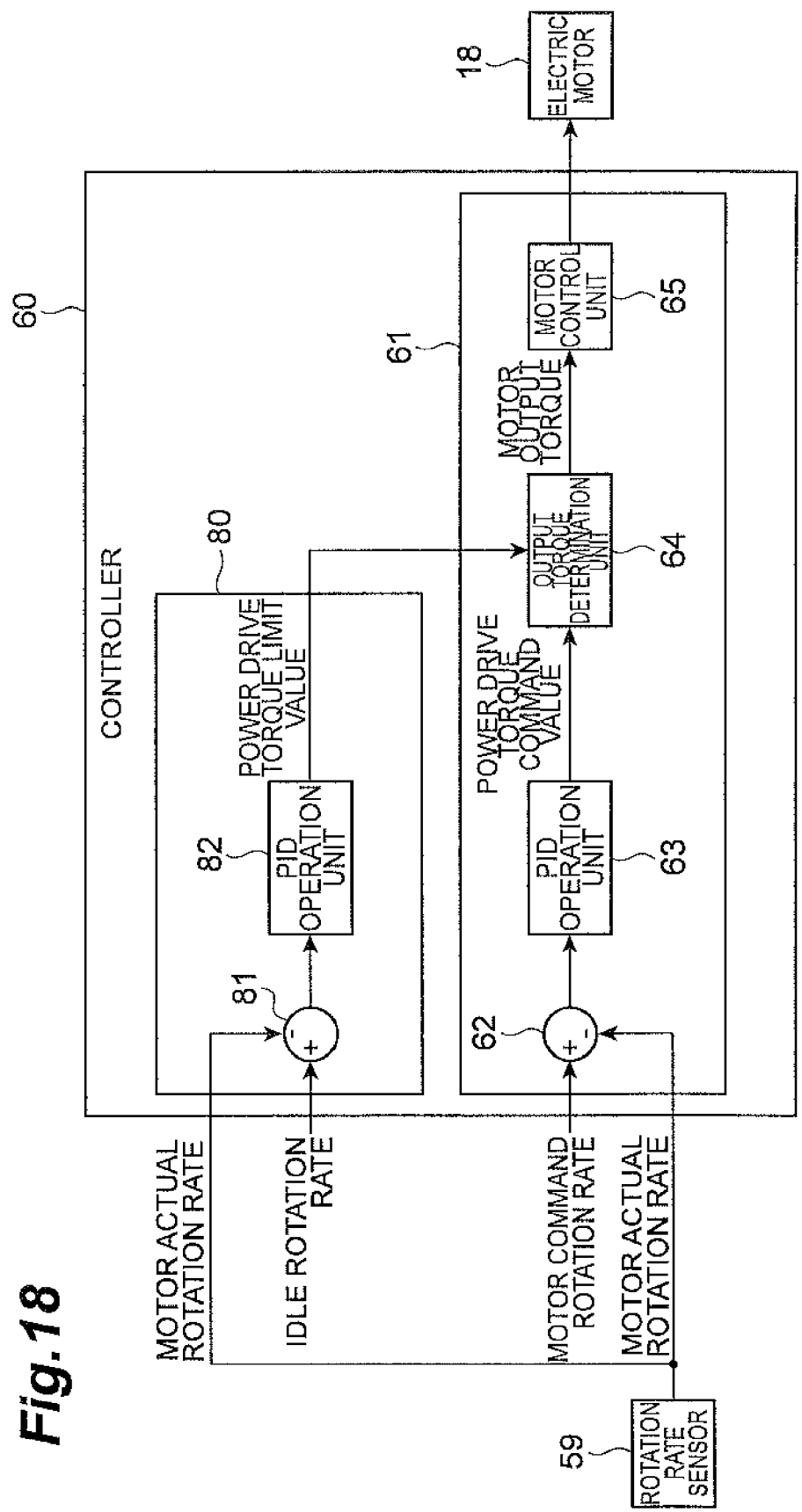

Fig.19

| CONTROL CONDITION | | CONTROL ITEMS | | |
|---|---|---|---|---|
| DIRECTION SENSOR | LEVER CONTROL STEERING CONTROL | POWER DRIVE TORQUE LIMIT | MOTOR ROTATION RATE COMMAND VALUE | BYPASS SOLENOID-CONTROLLED DIRECTIONAL CONTROL VALVE |
| OFF | DESCENT | ON | N_lift | ON or OFF |
| | DESCENT + TILT | OFF | N_tilt | ON |
| | DESCENT + PS | OFF | N_ps | ON |
| | DESCENT + TILT + PS | OFF | MAXIMUM OF N_tilt AND N_ps | ON |
| ON | DESCENT | PID CONTROL OF POWER DRIVE TORQUE LIMIT VALUE | MAXIMUM OF N_tilt AND N_psi | ON or OFF |
| | DESCENT + TILT | OFF | N_tilt | ON |
| | DESCENT + PS | OFF | N_ps | ON |
| | DESCENT + TILT + PS | OFF | MAXIMUM OF N_tilt AND N_ps | ON |

HYDRAULIC DRIVE DEVICE FOR CARGO HANDLING VEHICLE

BACKGROUND OF THE INVENTION

Field of the Invention

The present invention relates to a hydraulic drive device for cargo handling vehicle.

Related Background Art

A battery-powered forklift, which is one of cargo handling vehicles, is provided, for example, with a lift cylinder for moving a fork up and down, a tilt cylinder for tilting a mast, a hydraulic pump for supplying hydraulic oil to the lift cylinder and the tilt cylinder, and an electric motor for driving the hydraulic pump. The battery-powered forklift is sometimes subjected to cargo-handling regeneration as described below. During an operation of lowering a cargo with the fork, the hydraulic oil is returned from the lift cylinder to the hydraulic pump by making use of the weight of the cargo. This causes the hydraulic pump to drive the electric motor, whereby the electric motor comes to generate electric power. When the pressure of the return oil to the hydraulic pump is low, e.g., in a state in which there is no cargo on the fork (light load state), the hydraulic pump needs to be rotated by the electric motor in order to achieve a desired descent speed. In this case, the electric motor consumes power.

There is the hydraulic system described in Japanese Patent Application Laid-Open Publication No. 2-231398, which offers the technology for controlling the consumption of power. The hydraulic system described in the Publication No. 2-231398 is provided with a lift control valve arranged between a bottom chamber of the lift cylinder and the hydraulic pump, and a pilot-controlled directional control valve disposed on a branch path between the lift control valve and a tank-side passage of the hydraulic pump and configured to be switched between an open position and a close position. When the fork descends with a heavy load, the pressure of the return oil from the lift cylinder exceeds a pilot setting pressure. For this reason, the pilot-controlled directional control valve is switched to the close position, so as to forcibly feed the return oil to the hydraulic pump. When the fork descends in a state without load or with an extremely low load, the pressure of the return oil from the lift cylinder does not reach the pilot setting pressure. For this reason, the pilot-controlled directional control valve is kept at the open position and the low-pressure return oil does not flow to the hydraulic pump. The electric motor is held at a standstill.

SUMMARY OF THE INVENTION

Technical Problem

However, the above-described conventional technology has the following problem. Namely, during a single descent operation of the fork (object), even if the fork is loaded with such a cargo that the pressure of the return oil from the lift cylinder to the hydraulic pump is one enough to implement the regeneration operation of the hydraulic pump (electric motor) in a low descent speed state of the object, the pressure of the return oil will be a pressure that cannot implement the regeneration operation of the hydraulic pump (electric motor), in a high descent speed state of the object. In this situation as well, the pilot-controlled directional control valve is not opened and thus the return oil from the lift cylinder flows to the hydraulic pump. Therefore, the electric motor is driven with supply of power to achieve a desired descent speed, resulting in consumption of power.

An object of the present invention is to provide a hydraulic drive device for cargo handling vehicle capable of efficiently performing the cargo-handling regeneration in a high load state and ensuring a necessary descent speed with low power consumption in a low load state, in the single descent operation of the object.

One aspect of the present invention is a hydraulic drive device for cargo handling vehicle with a plurality of hydraulic cylinders including an up-and-down hydraulic cylinder for moving an up and down with supply and discharge of hydraulic oil, and a plurality of manual control means including an up-and-down control means for actuating the up-and-down hydraulic cylinder, the hydraulic drive device comprising: a tank reserving the hydraulic oil; a hydraulic pump for drawing in the hydraulic oil from the tank and supplying the hydraulic oil to the hydraulic cylinders; an electric motor for driving the hydraulic pump; a solenoid-controlled proportional valve disposed between an inlet port of the hydraulic pump and a bottom chamber of the up-and-down hydraulic cylinder and configured to open with a valve travel depending upon a control input of a descent control of the up-and-down control means; a pressure compensation valve disposed between a branch portion located between the hydraulic pump and the solenoid-controlled proportional valve and the tank and configured to open with a valve travel depending upon a pressure difference between pressures upstream and downstream of the solenoid-controlled proportional valve; and valve means disposed between the pressure compensation valve and the tank and configured to be switched between an open position and a close position.

In the foregoing aspect of the present invention, the solenoid-controlled proportional valve opens with the valve travel depending upon the control input of the up-and-down control means when the descent control of the up-and-down control means is performed, in a single descent operation of the object. At this time, the pressure difference between the pressures upstream and downstream of the solenoid-controlled proportional valve becomes large, for example, in a high load state in which there is a cargo on the object, and, therefore, the pressure compensation valve is switched toward the close position. If the valve means is switched to the close position here, there is no hydraulic oil returning from the up-and-down hydraulic cylinder to the tank and the whole hydraulic oil from the up-and-down hydraulic cylinder flows to the hydraulic pump. This enables efficient implementation of the cargo-handling regeneration. Since the pressure difference between the pressures upstream and downstream of the solenoid-controlled proportional valve becomes small, for example, in a low load state in which there is no cargo on the object, the pressure compensation valve is switched toward the open position. When the valve means is switched to the open position here, most of the hydraulic oil from the up-and-down hydraulic cylinder returns to the tank. This ensures a necessary descent speed of the object. Since there is little hydraulic oil flowing to the hydraulic pump, the electric motor is prevented from being driven with supply of power, which can decrease power consumption.

In the foregoing aspect of the present invention, when the descent operation of the object and another cargo handling operation are performed simultaneously, the valve means is switched to the open position. At this time, a flow rate of the hydraulic oil flowing to the hydraulic pump varies depending upon the cargo weight or load condition on the object. With a decrease of the flow rate of the hydraulic oil flowing to the hydraulic pump, the valve travel of the pressure compensation valve increases so as to increase the hydraulic oil returning to the tank by the decrease of the flow rate. With an increase of the flow rate of the hydraulic oil flowing to the hydraulic pump, the valve travel of the pressure compensation valve decreases so as to decrease the hydraulic oil returning to the tank by the increase of the flow rate. Through these operations, the flow rate of the hydraulic oil flowing from the bottom chamber of the up-and-down hydraulic cylinder is kept substantially constant. Therefore, the descent speed of the object can be kept substantially constant. Since it is possible to perform another cargo handling operation except for the descent of the object by making use of regenerative energy, the power consumption can be reduced.

In the foregoing aspect of the present invention, the hydraulic drive device may be configured as follows: the hydraulic drive device further comprises: setting means for setting a command rotation rate of the electric motor; rotation rate detecting means for detecting an actual rotation rate of the electric motor; electric motor controlling means for controlling the electric motor, based on the command rotation rate set by the setting means and the actual rotation rate detected by the rotation rate detecting means; and determining means for determining whether the descent control of the up-and-down control means is performed singly or controls of the plurality of manual control means including the descent control of the up-and-down control means are performed simultaneously; when the determining means determines that the descent control of the up-and-down control means is performed singly, the setting means sets the command rotation rate depending upon the control input of the descent control of the up-and-down control means; when the determining means determines that the controls of the plurality of manual control means including the descent control of the up-and-down control means are performed simultaneously, the setting means sets the command rotation rate depending upon a control input of the manual control means other than the up-and-down control means.

When the descent operation of the object and another cargo handling operation are carried out simultaneously, the setting means sets the command rotation rate depending upon the control input of the manual control means other than the up-and-down control means. This prevents the hydraulic oil from being supplied more than necessary to the hydraulic cylinder other than the up-and-down hydraulic cylinder, even in a control such that the up-and-down control means requires the rotation rate of the electric motor higher than the other manual control means does. For this reason, increase of loss can be inhibited.

In the foregoing aspect of the present invention, the hydraulic drive device may be configured as follows: the hydraulic drive device further comprises valve opening and closing controlling means for controlling the valve means in the following manner: when the determining means determines that the descent control of the up-and-down control means is performed singly, the valve opening and closing controlling means controls the valve means so as to be switched to the open position if a difference between the command rotation rate set by the setting means and the actual rotation rate detected by the rotation rate detecting means is not less than a predetermined value; when the determining means determines that the controls of the plurality of manual control means including the descent control of the up-and-down control means are performed simultaneously, the valve opening and closing controlling means controls the valve means so as to be switched to the open position.

Since in the single descent operation of the object the determination on switching of opening and closing of the valve means is made depending upon the difference between the command rotation rate of the electric motor and the actual rotation rate of the electric motor, there is no need for a pressure sensor or the like for control of the valve means. In simultaneous execution of the descent operation of the object and another cargo handling operation, the valve means is switched to the open position, whereby the hydraulic oil from the up-and-down hydraulic cylinder returns to the tank. Therefore, variation in the descent speed of the object can be suppressed even in the case where the other cargo handling operation is carried out during the descent operation of the object.

In the foregoing aspect of the present invention, the hydraulic drive device may be configured as follows: the hydraulic drive device further comprises torque limit controlling means operating in the following manner: when the determining means determines that the descent control of the up-and-down control means is performed singly, the torque limit controlling means imposes a limit on a power drive torque of the electric motor; when the determining means determines that the controls of the plurality of manual control means including the descent control of the up-and-down control means are performed simultaneously, the torque limit controlling means removes the limit on the power drive torque of the electric motor.

In the single descent operation of the object the power drive torque of the electric motor is limited, which can prevent power consumption more than necessary. In simultaneous execution of the descent operation of the object and another cargo handling operation, the limit on the power drive torque of the electric motor is removed, which can surely achieve the rotation rate of the electric motor necessary for the other cargo handling operation.

In the foregoing aspect of the present invention, the hydraulic drive device may be configured as follows: the hydraulic drive device further comprises running direction detecting means for detecting a running direction of the cargo handling vehicle; the torque limit controlling means has: first power drive torque limit value setting means for setting a power drive torque limit value of the electric motor to a predetermined value when the determining means determines that the descent control of the up-and-down control means is performed singly, in a state in which the running direction detecting means detects the running direction of the cargo handling vehicle being neutral; and second power drive torque limit value setting means for setting the power drive torque limit value of the electric motor, based on the actual rotation rate detected by the rotation rate detecting means and based on an idle rotation rate of the hydraulic pump or a target rotation rate corresponding to a rotation rate higher than the idle rotation rate, when the determining means determines that the descent control of the up-and-down control means is performed singly, in a state in which the running direction detecting means detects the running direction of the cargo handling vehicle being forward or backward.

For example, in the case of the cargo handling vehicle equipped with hydraulic power steering, the hydraulic pump needs to be kept rotating at a rotation rate not less than the idle rotation rate for power steering, during a forward or backward moving state. When the single descent operation of the object is performed in the state in which the running direction of the cargo handling vehicle is forward or backward, the power drive torque limit value of the electric motor is set based on the actual rotation rate of the electric motor and the target rotation rate. For example, the power drive torque limit value of the electric motor is set so that the rotation rate of the hydraulic pump becomes not less than the idle rotation rate. By this setting, the hydraulic pump rotates at the rotation rate not less than the idle rotation rate in the state in which the running direction of the cargo handling vehicle is forward or backward, which ensures smooth steering during the single descent operation of the object. When the rotation rate of the hydraulic pump is the idle rotation rate, the hydraulic pump rotates at the necessary minimum rotation rate, which reduces power consumption.

In the foregoing aspect of the present invention, the hydraulic drive device may be configured as follows: the second power drive torque limit value setting means sets the power drive torque limit value of the electric motor in the following manner: when the actual rotation rate is not less than the target rotation rate, the second power drive torque limit value setting means sets the power drive torque limit value of the electric motor to a first setting value; when the actual rotation rate is less than the target rotation rate, the second power drive torque limit value setting means sets the power drive torque limit value of the electric motor to a second setting value larger than the first setting value.

In this case, the actual rotation rate of the electric motor becomes closer to the target rotation rate. For this reason, the hydraulic pump can be made to rotate at the rotation rate not less than the idle rotation rate, while simplifying a processing configuration of the second power drive torque limit value setting means.

In the foregoing aspect of the present invention, the hydraulic drive device may be configured as follows: the second power drive torque limit value setting means calculates a rotation rate deviation between the target rotation rate and the actual rotation rate and sets the power drive torque limit value of the electric motor so as to make the rotation rate deviation zero.

In this case, there occurs little pulsation of the actual rotation rate of the electric motor and thus the actual rotation rate of the electric motor becomes substantially coincident with the target rotation rate. For this reason, the hydraulic pump can be made to rotate certainly at the rotation rate not less than the idle rotation rate.

Another aspect of the present invention is a hydraulic drive device for cargo handling vehicle provided with a plurality of hydraulic cylinders including an up-and-down hydraulic cylinder for moving an object up and down with supply and discharge of hydraulic oil, and a plurality of manual control members including an up-and-down control lever configured so as to actuate the up-and-down hydraulic cylinder, the hydraulic drive device comprising: a tank reserving the hydraulic oil; a hydraulic pump having an inlet port for drawing in the hydraulic oil and an outlet port for discharging the hydraulic oil: an electric motor for driving the hydraulic pump; a first oil passage connecting the tank and the inlet port; a second oil passage connecting the outlet port and the plurality of hydraulic cylinders; a third oil passage branching off from the first oil passage and connecting the first oil passage and a bottom chamber of the up-and-down hydraulic cylinder; a solenoid-controlled proportional valve disposed on the third oil passage and configured to open with a valve travel depending upon a control input of a descent control of the up-and-down control lever; a pressure compensation valve disposed between a branch portion of the third oil passage and the tank on the first oil passage and configured to open with a valve travel depending upon a pressure difference between pressures upstream and downstream of the solenoid-controlled proportional valve on the third oil passage; a directional control valve disposed between the pressure compensation valve and the tank on the first oil passage and configured to be switched between an open position and a close position; and a controller configured to control the solenoid-controlled proportional valve and the directional control valve.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a table showing a list of control items used in a lift descent control by the controller shown in FIG. 3.

FIG. 13 is a table showing a list of control items used in the lift descent control by the controller shown in FIG. 12.

FIG. 18 is a block diagram showing a configuration of a part of the controller, in the hydraulic drive device according to the third embodiment.

FIG. 19 is a table showing a list of control items used in the lift descent control by the controller shown in FIG. 18.

DESCRIPTION OF THE PREFERRED EMBODIMENTS

Figure 1:
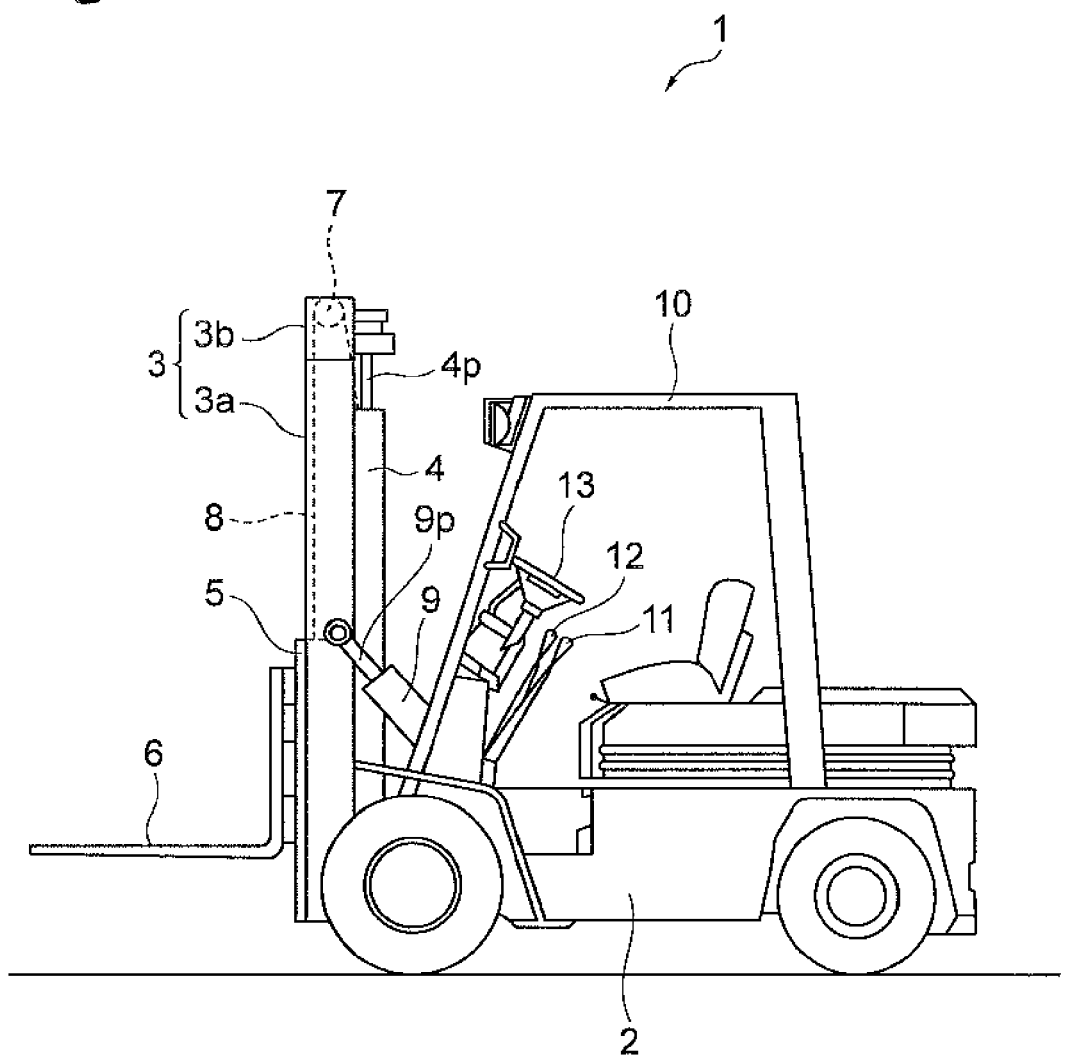
FIG. 1 is a side view showing a cargo handling vehicle with a hydraulic drive device according to the first embodiment.

Embodiments of the present invention will be described below in detail with reference to the drawings. In the drawings identical or equivalent elements will be denoted by the same reference signs, without redundant description.

FIG. 1 is a side view showing a cargo handling vehicle with a hydraulic drive device according to the first embodiment. In the same drawing, the cargo handling vehicle 1 according to the present embodiment is a battery-powered forklift. The forklift 1 is provided with a body frame 2 and a mast 3 arranged in the front part of the body frame 2. The mast 3 consists of a right and left pair of outer masts 3a and inner masts 3b. Each outer mast 3a is supported on the body frame 2 so as to be tiltable. Each inner mast 3b is arranged inside the outer mast 3a and is movable up and down relative to the outer mast 3a.

A lift cylinder 4 as an up-and-down hydraulic cylinder is arranged on the back of the mast 3. The top end of a piston rod 4p of the lift cylinder 4 is coupled to the upper part of the inner masts 3b.

A lift bracket 5 is supported on the inner masts 3b so as to be movable up and down. A fork (up-and-down object) 6 to carry a cargo is attached to the lift bracket 5. A chain wheel 7 is provided in the upper part of the inner masts 3b and a chain 8 is hooked on the chain wheel 7. One end of the chain 8 is coupled to the lift cylinder 4 and the other end of the chain 8 to the lift bracket 5. With extension and contraction of the lift cylinder 4, the fork 6 moves up and down along with the lift bracket 5 through the chain 8.

Tilt cylinders 9 as tilt hydraulic cylinders are supported on the right and left sides of the body frame 2, respectively. The tip of a piston rod 9b of each tilt cylinder 9 is rotatably coupled to a nearly central part in the height direction of the outer mast 3a. With extension and contraction of the tilt cylinders 9, the mast 3 tilts.

A driver's cabin 10 is provided on the top of the body frame 2. In the front part of the driver's cabin 10 the vehicle is provided with a lift control lever 11 for actuating the lift cylinder 4 to move the fork 6 up and down, and a tilt control lever 12 for actuating the tilt cylinders 9 to tilt the mast 3.

A steering mechanism 13 for steering is provided in the front part of the driver's cabin 10. The steering mechanism 13 is a hydraulic power steering mechanism. Namely, the steering mechanism 13 can assist driver's steering action by a PS (Power Steering) cylinder 14 (cf. FIG. 2) as a hydraulic cylinder for power steering (PS).

The forklift 1 has an attachment cylinder 15 (cf. FIG. 2) as an attachment hydraulic cylinder to operate an attachment (not shown). The attachment is, for example, a mechanism for laterally moving, inclining, or rotating the fork 6, or the like. The driver's cabin 10 is provided with an attachment control lever (not shown) for actuating the attachment cylinder 15 to operate the attachment.

The driver's cabin 10 is provided with a direction switch for switching a running direction of the forklift 1 (forward, backward, or neutral), which is not shown in particular.

Figure 2:
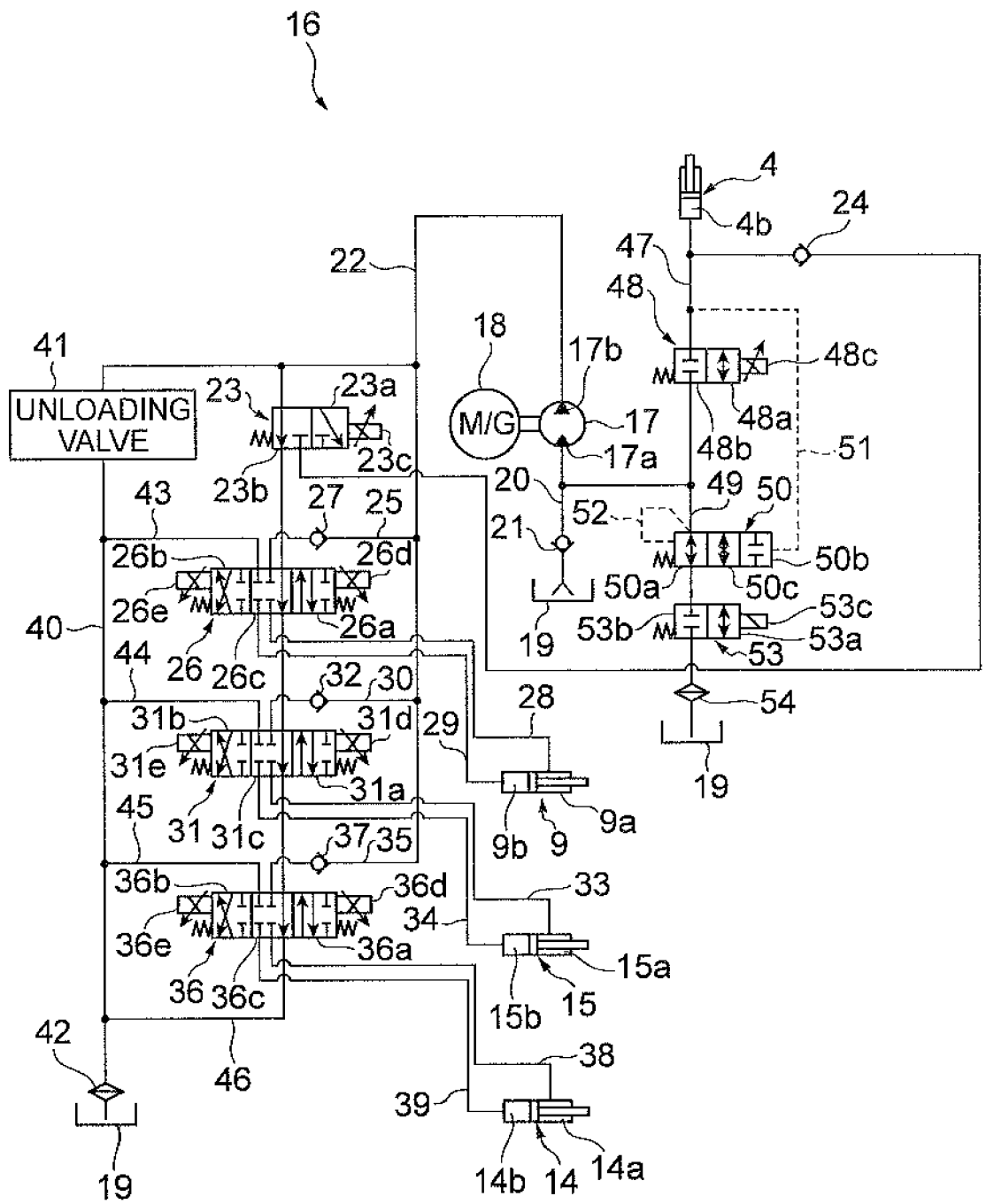
FIG. 2 is a hydraulic circuit diagram showing the hydraulic drive device according to the first embodiment.

FIG. 2 is a hydraulic circuit diagram showing the hydraulic drive device according to the first embodiment. In the same drawing, the hydraulic drive device 16 of the present embodiment drives the lift cylinder 4, tilt cylinders 9, attachment cylinder 15, and PS cylinder 14.

The hydraulic drive device 16 has a single hydraulic pump motor 17 and a single electric motor 18 for driving the hydraulic pump motor 17. The hydraulic pump motor 17 has an inlet port 17a for drawing in the hydraulic oil and an outlet port 17b for discharging the hydraulic oil. The hydraulic pump motor 17 is configured so as to be rotatable in one direction.

The electric motor 18 functions as an electric motor or as an electric generator. Specifically, when the hydraulic pump motor 17 operates as a hydraulic pump, the electric motor 18 functions as an electric motor; when the hydraulic pump motor 17 operates as a hydraulic motor, the electric motor 18 functions as an electric generator. While the electric motor 18 functions as an electric generator, electricity generated by the electric motor 18 is stored in a battery (not shown). Namely, regeneration operation is carried out.

A tank 19 reserving the hydraulic oil is connected through a hydraulic pipe 20 to the inlet port 17a of the hydraulic pump motor 17. The hydraulic pipe 20 is provided with a check valve 21 for allowing the hydraulic oil to flow only in the direction from the tank 19 to the hydraulic pump motor 17.

The outlet port 17b of the hydraulic pump motor 17 and a bottom chamber 4b of the lift cylinder 4 are connected through a hydraulic pipe 22. A solenoid-controlled proportional valve 23 for lift ascent is disposed on the hydraulic pipe 22. The solenoid-controlled proportional valve 23 is switched between an open position 23a and a close position 23b. At the open position 23a, the solenoid-controlled proportional valve 23 allows the hydraulic oil to flow from the hydraulic pump motor 17 to the bottom chamber 4b of the lift cylinder 4. At the close position 23b, the solenoid-controlled proportional valve 23 interrupts the flow of the hydraulic oil from the hydraulic pump motor 17 to the bottom chamber 4b of the lift cylinder 4.

The solenoid-controlled proportional valve 23 is normally at the close position 23b (as shown). When a control signal (solenoid current command value for lift ascent depending upon a control input of an ascent control of the lift control lever 11) is fed to a solenoid control unit 23c, the solenoid-controlled proportional valve 23 is switched to the open position 23a. Then, the hydraulic oil is supplied from the hydraulic pump motor 17 to the bottom chamber 4b of the lift cylinder 4, so as to extend the lift cylinder 4. This operation results in raising the fork 6. When the solenoid-controlled proportional valve 23 is at the open position 23a, the solenoid-controlled proportional valve 23 opens with a valve travel according to the control signal. A check valve 24 for allowing the hydraulic oil to flow only in the direction from the solenoid-controlled proportional valve 23 to the lift cylinder 4 is provided between the solenoid-controlled proportional valve 23 and the lift cylinder 4 on the hydraulic pipe 22.

A solenoid-controlled proportional valve 26 for tilt is connected through a hydraulic pipe 25 to a branch portion located between the hydraulic pump motor 17 and the solenoid-controlled proportional valve 23 on the hydraulic pipe 22. The hydraulic pipe 25 is provided with a check valve 27 for allowing the hydraulic oil to flow only in the direction from the hydraulic pump motor 17 to the solenoid-controlled proportional valve 26.

The solenoid-controlled proportional valve 26 is connected to rod chambers 9a and bottom chambers 9b of the tilt cylinders 9 through hydraulic pipes 28, 29, respectively. The solenoid-controlled proportional valve 26 is switched among an open position 26a, an open position 26b, and a close position 26c. At the open position 26a, the solenoid-controlled proportional valve 26 allows the hydraulic oil to flow from the hydraulic pump motor 17 to the rod chambers 9a of the tilt cylinders 9. At the open position 26b, the solenoid-controlled proportional valve 26 allows the hydraulic oil to flow from the hydraulic pump motor 17 to the bottom chambers 9b of the tilt cylinders 9. At the close position 26c, the solenoid-controlled proportional valve 26 interrupts the flow of the hydraulic oil from the hydraulic pump motor 17 to the tilt cylinders 9.

The solenoid-controlled proportional valve 26 is normally at the close position 26c (as shown). When a control signal (solenoid current command value for tilt depending upon a control input of a backward tilt control of the tilt control lever 12) is fed to a solenoid control unit 26d on the open position 26a side, the solenoid-controlled proportional valve 26 is switched to the open position 26a. When a control signal (solenoid current command value for tilt depending upon a control input of a forward tilt control of the tilt control lever 12) is fed to a solenoid control unit 26e on the open position 26b side, the solenoid-controlled proportional valve 26 is switched to the open position 26b. When the solenoid-controlled proportional valve 26 is switched to the open position 26a, the hydraulic oil is supplied from the hydraulic pump motor 17 to the rod chambers 9a of the tilt cylinders 9, so as to contract the tilt cylinders 9. This operation results in inclining the mast 3 backward. When the solenoid-controlled proportional valve 26 is switched to the open position 26b, the hydraulic oil is supplied from the hydraulic pump motor 17 to the bottom chambers 9b of the tilt cylinders 9, so as to extend the tilt cylinders 9. This operation results in inclining the mast 3 forward. When the solenoid-controlled proportional valve 26 is at the open position 26a or 26b, the solenoid-controlled proportional valve 26 opens with a valve travel according to the control signal.

A solenoid-controlled proportional valve 31 for attachment is connected through a hydraulic pipe 30 to an upstream point of the check valve 27 on the hydraulic pipe 25. The hydraulic pipe 30 is provided with a check valve 32 for allowing the hydraulic oil to flow only in the direction from the hydraulic pump motor 17 to the solenoid-controlled proportional valve 31.

The solenoid-controlled proportional valve 31 is connected to a rod chamber 15a and a bottom chamber 15b of the attachment cylinder 15 through hydraulic pipes 33, 34, respectively. The solenoid-controlled proportional valve 31 is switched among an open position 31a, an open position 31b, and a close position 31c. At the open position 31a, the solenoid-controlled proportional valve 31 allows the hydraulic oil to flow from the hydraulic pump motor 17 to the rod chamber 15a of the attachment cylinder 15. At the open position 31b, the solenoid-controlled proportional valve 31 allows the hydraulic oil to flow from the hydraulic pump motor 17 to the bottom chamber 15b of the attachment cylinder 15. At the close position 31c, the solenoid-controlled proportional valve 31 interrupts the flow of the hydraulic oil from the hydraulic pump motor 17 to the attachment cylinder 15.

The solenoid-controlled proportional valve 31 is normally at the close position 31c (as shown). When a control signal (solenoid current command value for attachment depending upon a control input of a one-side control of the attachment control lever) is fed to a solenoid control unit 31d on the open position 31a side, the solenoid-controlled proportional valve 31 is switched to the open position 31a. When a control signal (solenoid current command value for attachment depending upon a control input of the other-side control of the attachment control lever) is fed to a solenoid control unit 31e on the open position 31b side, the solenoid-controlled proportional valve 31 is switched to the open position 31b. The operation of the attachment cylinder 15 is omitted from the description herein. When the solenoid-controlled proportional valve 31 is at the open position 31a or 31b, the solenoid-controlled proportional valve 31 opens with a valve travel according to the control signal.

A solenoid-controlled proportional valve 36 for PS is connected through a hydraulic pipe 35 to an upstream point of the check valve 32 on the hydraulic pipe 30. The hydraulic pipe 35 is provided with a check valve 37 for allowing the hydraulic oil to flow only in the direction from the hydraulic pump motor 17 to the solenoid-controlled proportional valve 36.

The solenoid-controlled proportional valve 36 is connected to a rod chamber 14a and a bottom chamber 14b of the PS cylinder 14 through hydraulic pipes 38, 39, respectively. The solenoid-controlled proportional valve 36 is switched among an open position 36a, an open position 36b, and a close position 36c. At the open position 36a, the solenoid-controlled proportional valve 36 allows the hydraulic oil to flow from the hydraulic pump motor 17 to the rod chamber 14a of the PS cylinder 14. At the open position 36b, the solenoid-controlled proportional valve 36 allows the hydraulic oil to flow from the hydraulic pump motor 17 to the bottom chamber 14b of the PS cylinder 14. At the close position 36c, the solenoid-controlled proportional valve 36 interrupts the flow of the hydraulic oil from the hydraulic pump motor 17 to the PS cylinder 14.

The solenoid-controlled proportional valve 36 is normally at the close position 36c (as shown). When a control signal (solenoid current command value for PS depending upon a control speed to either of the right and the left of the steering wheel of the steering mechanism 13) is fed to a solenoid control unit 36d on the open position 36a side, the solenoid-controlled proportional valve 36 is switched to the open position 36a. When a control signal (solenoid current command value for PS depending upon a control speed to the other of the right and the left of the steering wheel of the steering mechanism 13) is fed to a solenoid control unit 36e on the open position 36b side, the solenoid-controlled proportional valve 36 is switched to the open position 36b. The operation of the PS cylinder 14 is omitted from the description herein. When the solenoid-controlled proportional valve 36 is at the open position 36a or 36b, the solenoid-controlled proportional valve 36 opens with a valve travel according to the control signal.

A branch portion located between the hydraulic pump motor 17 and the solenoid-controlled proportional valve 23 on the hydraulic pipe 22 is connected through a hydraulic pipe 40 to the tank 19. The hydraulic pipe 40 is provided with an unloading valve 41 and a filter 42. The solenoid-controlled proportional valves 26, 31, and 36 are connected through respective hydraulic pipes 43-45 to the hydraulic pipe 40. The solenoid-controlled proportional valves 23, 26, 31, and 36 are connected through a hydraulic pipe 46 to the hydraulic pipe 40.

The inlet port 17a of the hydraulic pump motor 17 and the bottom chamber 4b of the lift cylinder 4 are connected through a hydraulic pipe 47. The hydraulic pipe 47 is provided with a solenoid-controlled proportional valve 48 for lift descent. The solenoid-controlled proportional valve 48 is switched between an open position 48a and a close position 48b. At the open position 48a, the solenoid-controlled proportional valve 48 allows the hydraulic oil to flow from the bottom chamber 4b of the lift cylinder 4 to the inlet port 17a of the hydraulic pump motor 17. At the close position 48b, the solenoid-controlled proportional valve 48 interrupts the flow of the hydraulic oil from the bottom chamber 4b of the lift cylinder 4 to the inlet port 17a of the hydraulic pump motor 17.

The solenoid-controlled proportional valve 48 is normally at the close position 48b (as shown). When a control signal (solenoid current command value for lift descent depending upon a control input of a descent control of the lift control lever 11) is fed to a solenoid control unit 48c, the solenoid-controlled proportional valve 48 is switched to the open position 48a. Then, the fork 6 descends because of its own weight and the lift cylinder 4 contracts with the descent of the fork 6. This causes the hydraulic oil to flow out from the bottom chamber 4b of the lift cylinder 4. The solenoid-controlled proportional valve 48, when being at the open position 48a, opens with a valve travel according to the control signal.

A branch portion located between the hydraulic pump motor 17 and the solenoid-controlled proportional valve 48 on the hydraulic pipe 47 is connected through a hydraulic pipe 49 to the tank 19. The hydraulic pipe 49 is provided with a pressure compensation valve 50. The pressure compensation valve 50 is a flow control valve 50 with a pressure compensation function.

The pressure compensation valve 50 is switched among an open position 50a, a close position 50b, and a throttle position 50c. At the open position 50a, the pressure compensation valve 50 allows the hydraulic oil to flow. At the close position 50b, the pressure compensation valve 50 interrupts the flow of the hydraulic oil. At the throttle position 50c, the pressure compensation valve 50 regulates the flow rate of the hydraulic oil. A pilot control unit on the close position 50b side of the pressure compensation valve 50 and the upstream side (front side) of the solenoid-controlled proportional valve 48 are connected through a pilot flow passage 51. A pilot control unit on the open position 50a side of the pressure compensation valve 50 and the downstream side (rear side) of the solenoid-controlled proportional valve 48 are connected through a pilot flow passage 52. The pressure compensation valve 50 opens with a valve travel depending upon a pressure difference between pressures upstream and downstream of the solenoid-controlled proportional valve 48. Specifically, the pressure compensation valve 50 is normally at the close position (as shown). As the pressure difference between pressures upstream and downstream of the solenoid-controlled proportional valve 48 increases, the valve travel of the pressure compensation valve 50 becomes smaller.

A solenoid-controlled directional control valve (valve means) 53 for bypass is provided between the pressure compensation valve 50 and the tank 19 on the hydraulic pipe 49. The solenoid-controlled directional control valve 53 is an on-off valve and is switched between an open position 53a and a close position 53b. At the open position 53a, the solenoid-controlled directional control valve 53 allows the hydraulic oil to flow. At the close position 53b, the solenoid-controlled directional control valve 53 interrupts the flow of the hydraulic oil. The solenoid-controlled directional control valve 53 is normally at the close position 53b (as shown). The solenoid-controlled directional control valve 53 is switched to the open position 53a with input of an ON signal to a solenoid control unit 53c. The hydraulic pipe 49 is provided with a filter 54. Each of the hydraulic pipes 20, 22, 25, 28-30, 33-35, 38-40, 43-47, and 49 constitutes an oil passage.

Figure 3:
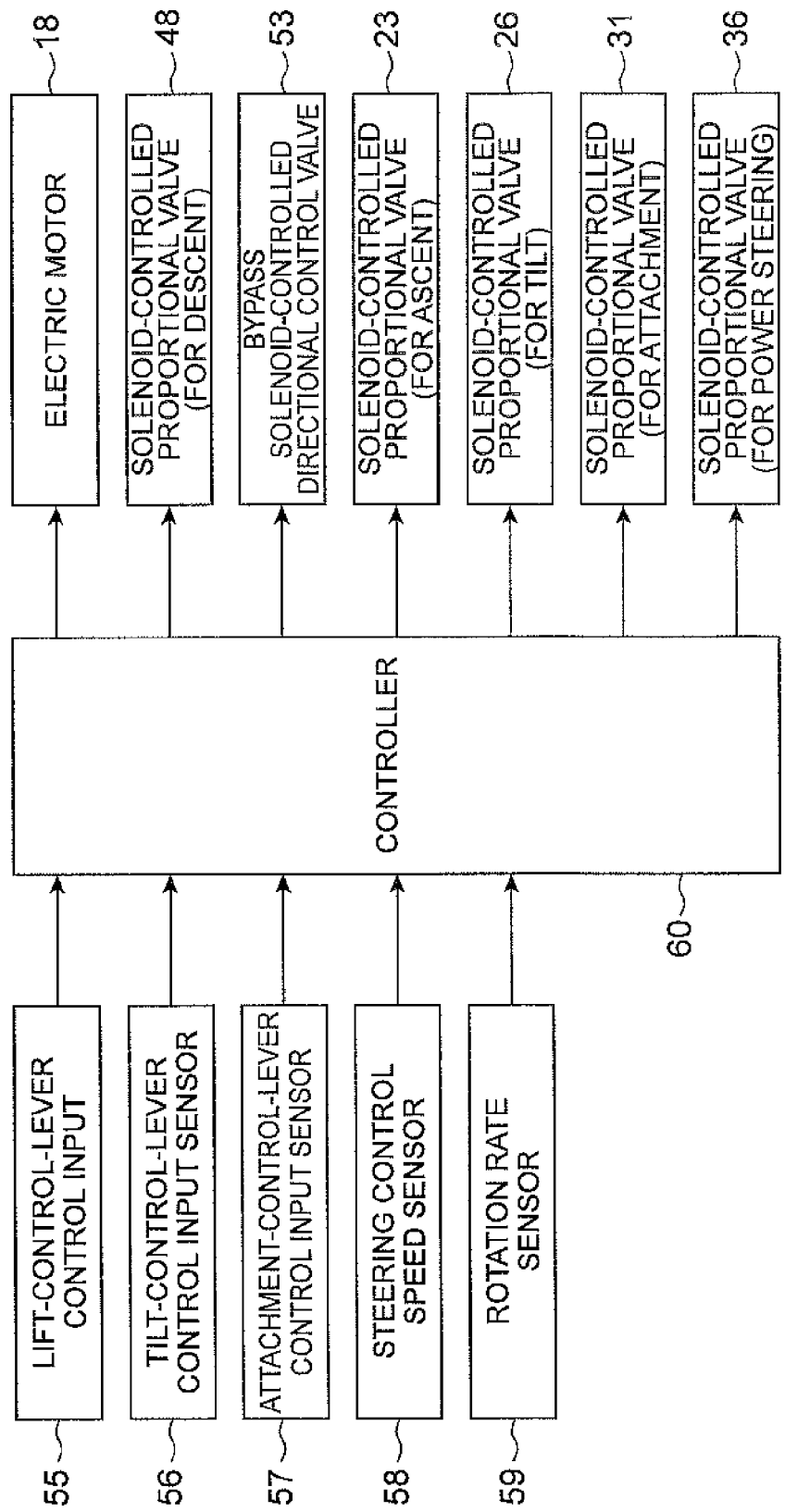
FIG. 3 is a configuration diagram showing a control system of the hydraulic drive device shown in FIG. 2.

FIG. 3 is a configuration diagram showing a control system of the hydraulic drive device 16. In the same drawing, the hydraulic drive device 16 has a lift control lever control input sensor 55 for detecting a control input of the lift control lever 11, a tilt control lever control input sensor 56 for detecting a control input of the tilt control lever 12, an attachment control lever control input sensor 57 for detecting a control input of the attachment control lever (not shown), a steering control speed sensor 58 for detecting a control speed of the steering wheel of the steering mechanism 13, a rotation rate sensor (rotation rate detecting means) 59 for detecting an actual rotation rate of the electric motor 18 (motor actual rotation rate), and a controller 60.

The controller 60 receives detected values from the control lever control input sensors 55-57, steering control speed sensor 58, and rotation rate sensor 59 and performs predetermined processing to control the electric motor 18, solenoid-controlled proportional valves 23, 26, 31, 36, 48, and solenoid-controlled directional control valve 53. Namely, the controller 60 is configured to control the electric motor 18, each of the solenoid-controlled proportional valves 23, 26, 31, 36, 48, and the solenoid-controlled directional control valve 53. The controller 60 is an electronic control unit that generally controls the hydraulic drive device 16. The controller 60 has a CPU (Central Processing Unit), a ROM (Read Only Memory), a RAM (Random Access Memory), and so on, and performs various controls by loading a program stored in the ROM, onto the RAM and executing the program in the CPU.

Figure 4:
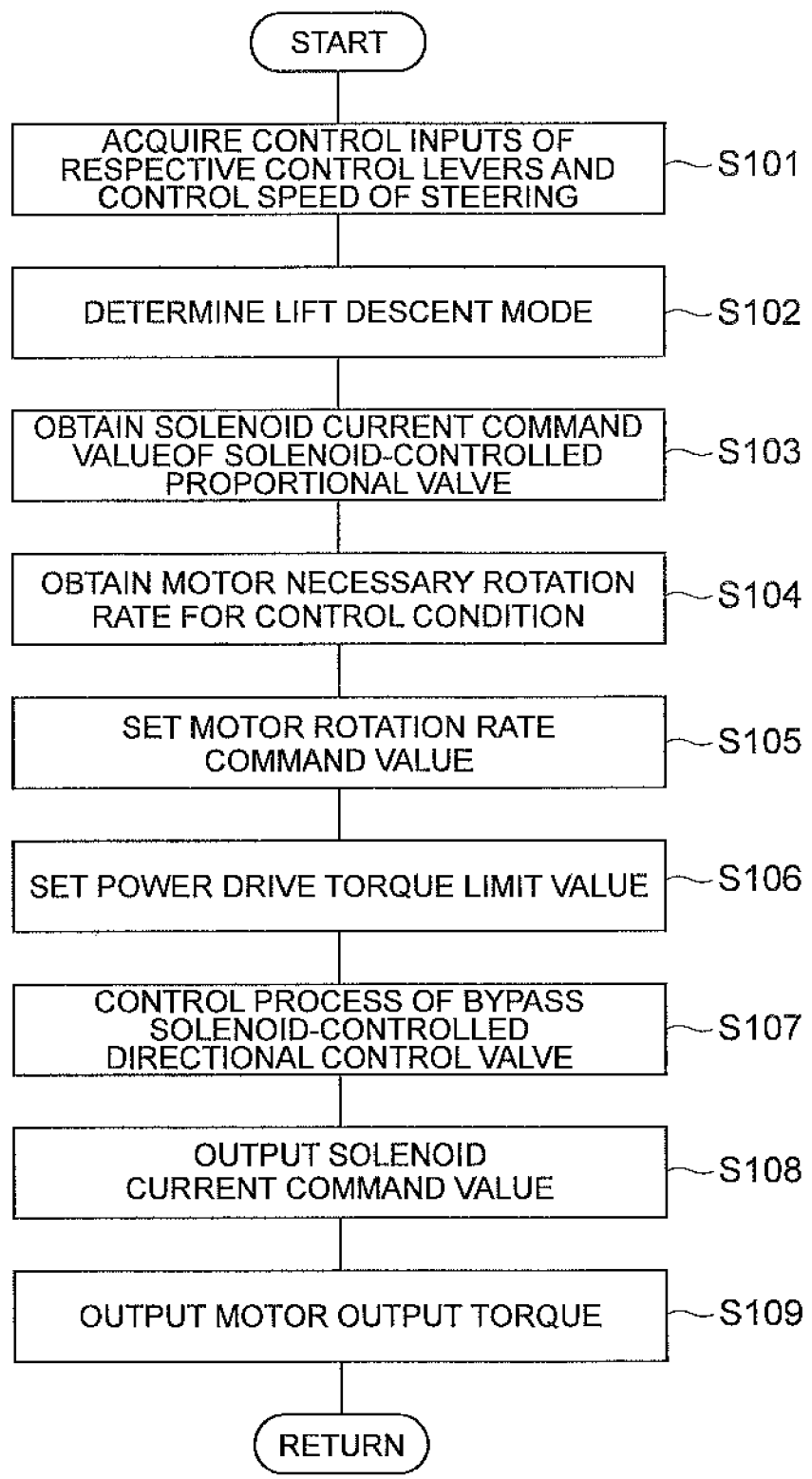
FIG. 4 is a flowchart showing a control process procedure executed by a controller shown in FIG. 3.

FIG. 4 is a flowchart showing a control process procedure executed by the controller 60. This control process is focused on only an operation involving the descent of the fork 6 (lift descent). The period of execution of this control process is appropriately determined by experiment or the like.

First, the controller 60 acquires the respective control inputs of the lift control lever 11, tilt control lever 12, and attachment control lever detected by the control lever control input sensors 55-57, and the control speed of the steering wheel of the steering mechanism 13 detected by the steering control speed sensor 58 (S101).

Subsequently, the controller 60 determines a lift descent mode as a control condition, based on the respective control inputs of the lift control lever 11, tilt control lever 12, and attachment control lever and the control speed of the steering wheel acquired by the process in S101 (S102). Lift descent modes include the following controls: lift descent single control, lift descent+tilt control, lift descent+attachment control, lift descent+power steering (PS) control, and, lift descent+tilt+power steering (PS) control.

Next, the controller 60 determines solenoid-controlled proportional valve solenoid current command values depending upon the respective control inputs of the lift control lever 11, tilt control lever 12, and attachment control lever and the control speed of the steering 13 acquired by the process in S101 and the determined lift descent mode (S103). The solenoid-controlled proportional valve solenoid current command values include a lift descent solenoid current command value depending upon the control input of the descent control of the lift control lever 11, a tilt solenoid current command value depending upon the control input of the tilt control lever 12, an attachment solenoid current command value depending upon the control input of the attachment control lever, and a power steering (PS) solenoid current command value depending upon the control speed of the steering 13.

After that, the controller 60 obtains a motor necessary rotation rate corresponding to the control condition determined by the process in S102 (S104). Motor necessary rotation rates include a lift necessary motor rotation rate, a tilt necessary motor rotation rate, an attachment necessary motor rotation rate, and a power steering (PS) necessary motor rotation rate. The lift necessary motor rotation rate is a rotation rate of the electric motor 18 necessary for execution of the lift operation. The tilt necessary motor rotation rate is a rotation rate of the electric motor 18 necessary for execution of the tilt operation. The attachment necessary motor rotation rate is a rotation rate of the electric motor 18 necessary for execution of the attachment operation. The PS necessary motor rotation rate is a rotation rate of the electric motor 18 necessary for execution of the PS operation.

Next, the controller 60 sets a motor rotation rate command value (motor command rotation rate), based on the lift descent mode determined by the process in S102 and the motor necessary rotation rate obtained by the process in S104 (S105). At this time, the motor command rotation rate is set as shown in FIG. 5. Specifically, in the case of lift descent single control, the controller 60 sets the motor command rotation rate to lift necessary motor rotation rate N_lift. In the case of lift descent+tilt control, the controller 60 sets the motor command rotation rate to tilt necessary motor rotation rate N_tilt. In the case of lift descent+attachment control, the controller 60 sets the motor command rotation rate to attachment necessary motor rotation rate N_atmt. In the case of lift descent+power steering control, the controller 60 sets the motor command rotation rate to PS necessary motor rotation rate N_ps. In the case of lift descent+tilt+power steering control, the controller 60 sets the motor command rotation rate to a maximum of tilt necessary motor rotation rate N_tilt and PS necessary motor rotation rate N_ps.

Next, the controller 60 sets a power drive torque limit value of the electric motor 18, based on the lift descent mode determined by the process in S102 (S106). The power drive torque limit value is an allowable value of power drive torque. In the case of lift descent single control, as shown in FIG. 5, the controller 60 sets the power drive torque limit to ON. At this time, the power drive torque limit value is set, for example, to 0 Nm (0%) or a value close to 0 Nm. In the cases of lift descent+tilt control, lift descent+attachment control, lift descent+power steering control, and, lift descent+tilt+power steering control, the controller 60 sets the power drive torque limit to OFF. Namely, the power drive torque limit value is set to 100%.

Figure 6:
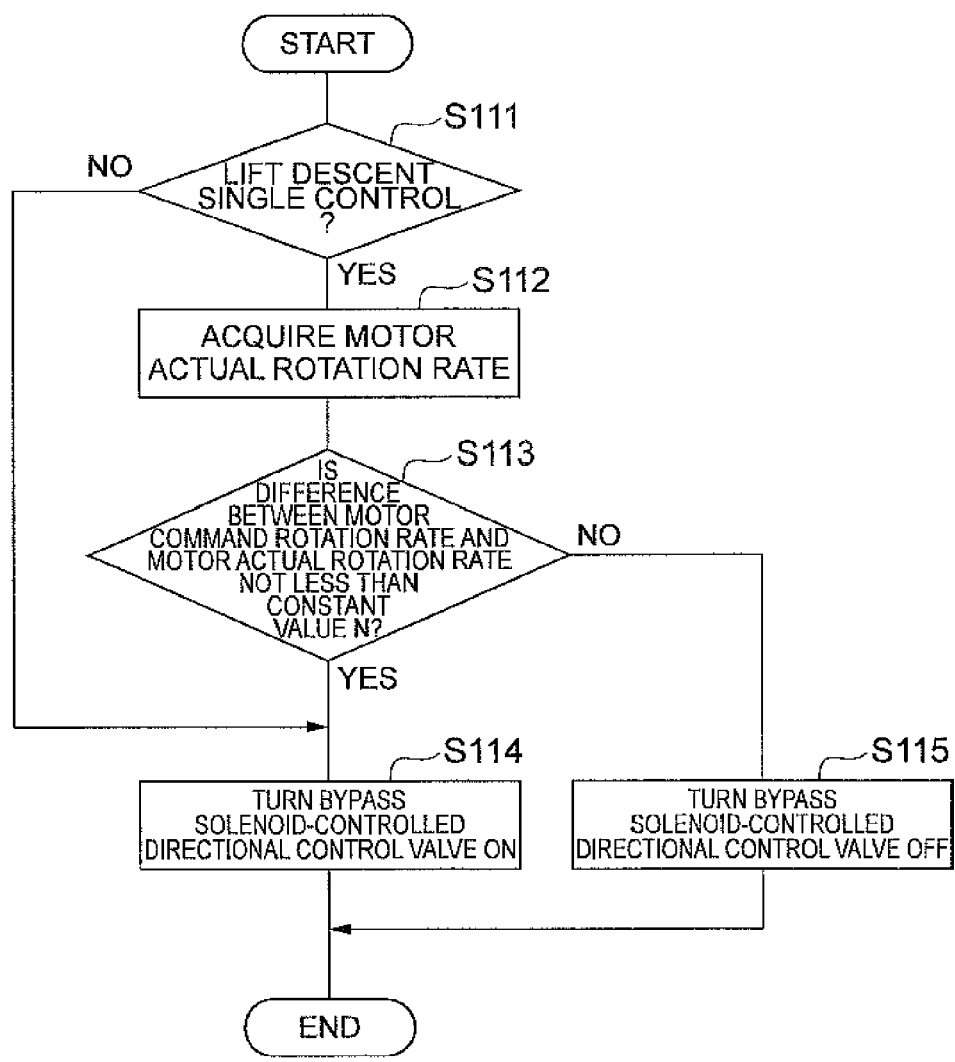
FIG. 6 is a flowchart showing the details of a control process procedure of a bypass solenoid-controlled directional control valve shown in FIG. 4.

Thereafter, the controller 60 controls opening and closing (ON and OFF) of the bypass solenoid-controlled directional control valve 53, based on the lift descent mode determined by the process in S102, the motor command rotation rate set by the process in S105, and the motor actual rotation rate detected by the rotation rate sensor 59 (S107). FIG. 6 shows the details of the control process procedure of the solenoid-controlled directional control valve 53 performed by the controller 60.

In FIG. 6, first, the controller 60 determines whether the lift descent mode is the lift descent single control (S111). When determining that the lift descent mode is the lift descent single control, the controller 60 acquires the motor actual rotation rate detected by the rotation rate sensor 59 (S112).

Next, the controller 60 determines whether a difference between the motor command rotation rate set by the process in S105 and the motor actual rotation rate is not less than a constant value N (S113). When determining that the difference between the motor command rotation rate and the motor actual rotation rate is not less than the constant value N, the controller 60 sends an ON signal to the solenoid control unit 53c of the solenoid-controlled directional control valve 53. By this, the controller 60 turns the solenoid-controlled directional control valve 53 to the open position 53a (ON) (S114). When determining that the difference between the motor command rotation rate and the motor actual rotation rate is less than the constant value N, the controller 60 sends an OFF signal to the solenoid control unit 53c of the solenoid-controlled directional control valve 53. By this, the controller 60 turns the solenoid-controlled directional control valve 53 to the close position 53b (OFF) (S115).

When determining by the process in S111 that the lift descent mode is not the lift descent single control, or that the lift descent mode is any one mode of the lift descent+tilt control, lift descent+attachment control, lift descent+power steering control, and, lift descent+tilt+power steering control, the controller 60 sends an ON signal to the solenoid control unit 53c of the solenoid-controlled directional control valve 53, as also shown in FIG. 5. By this, the controller 60 turns the solenoid-controlled directional control valve 53 ON (S114).

In the present process, the controller 60 is configured to turn the solenoid-controlled directional control valve 53 ON when the difference between the motor command rotation rate and the motor actual rotation rate is not less than the constant value N and to turn the solenoid-controlled directional control valve 53 OFF when the difference between the motor command rotation rate and the motor actual rotation rate is less than the constant value N, but the process herein does not have to be limited to this example. For example, in order to prevent chattering, the controller 60 may be configured to turn the solenoid-controlled directional control valve 53 ON when the difference between the motor command rotation rate and the motor actual rotation rate is not less than a constant value N_on and to turn the solenoid-controlled directional control valve 53 OFF when the difference between the motor command rotation rate and the motor actual rotation rate is not more than a constant value N_off (<N_on).

Referring back to FIG. 4, after execution of the process in S107, the controller 60 sends the solenoid-controlled proportional valve solenoid current command value obtained by the process in S103, to the solenoid control unit of the corresponding solenoid-controlled proportional valve (S108). At this time, the controller 60 sends the lift descent solenoid current command value to the solenoid control unit 48c of the solenoid-controlled proportional valve 48. When obtaining the tilt solenoid current command value, the controller 60 sends the current command value to either of the solenoid control units 26*d*, 26*e* of the solenoid-controlled proportional valve 26. When obtaining the attachment solenoid current command value, the controller 60 sends the current command value to either of the solenoid control units 31*d*, 31*e* of the solenoid-controlled proportional valve 31. When obtaining the PS solenoid current command value, the controller 60 sends the current command value to either of the solenoid control units 36*d*, 36*e* of the solenoid-controlled proportional valve 36.

Next, the controller 60 obtains the output torque of the electric motor 18, based on the motor rotation rate command value (motor command rotation rate) set by the process in S105, the motor actual rotation rate detected by the rotation rate sensor 59, and the power drive torque limit value of the electric motor 18 set by the process in S106. The controller 60 sends the obtained output torque as a control signal to the electric motor 18 (S109). The process in S109 is executed by a motor torque output unit 61 included in the controller 60, as shown in FIG. 7.

Figure 7:
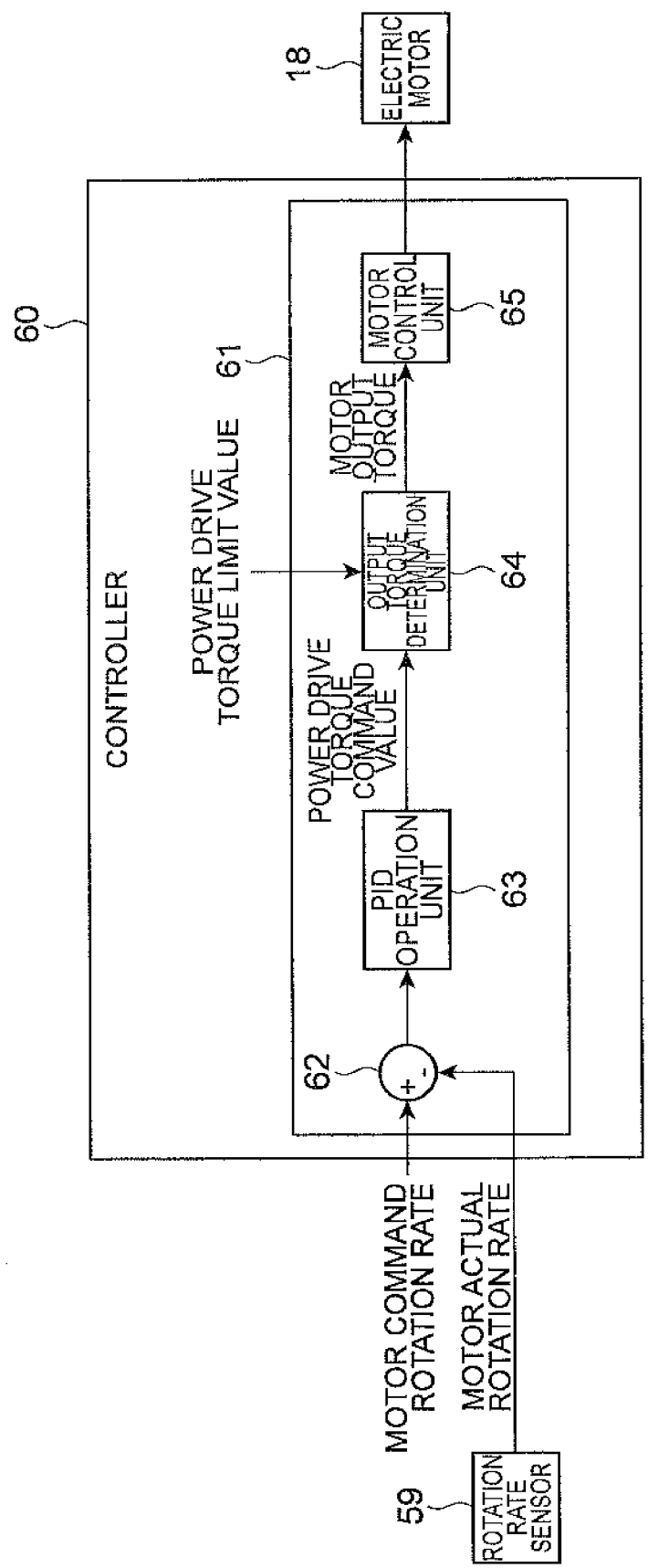
FIG. 7 is a block diagram showing the details of a motor torque output process procedure shown in FIG. 4.

As shown in FIG. 7, the motor torque output unit 61 has a comparison unit 62, a PID operation unit 63, an output torque determination unit 64, and a motor controlling unit 65. The comparison unit 62 calculates a rotation rate deviation between the motor command rotation rate set by the process in S105 and the motor actual rotation rate detected by the rotation rate sensor 59. The PID operation unit 63 performs the PID operation of the rotation rate deviation between the motor command rotation rate and the motor actual rotation rate to obtain a power drive torque command value of the electric motor 18 to make the rotation rate deviation zero. The PID operation is a combinational operation of proportional operation, integral operation, and derivative operation.

The output torque determination unit 64 compares the power drive torque command value obtained by the PID operation unit 63 with the power drive torque limit value of the electric motor 18 set by the process in S106, to determine the output torque of the electric motor 18. Specifically, when the power drive torque command value is not more than the power drive torque limit value, the output torque determination unit 64 determines that the power drive torque command value is the output torque of the electric motor 18. When the power drive torque command value is higher than the power drive torque limit value, the output torque determination unit 64 determines that the power drive torque limit value is the output torque of the electric motor 18. The motor controlling unit 65 converts the output torque of the electric motor 18 determined by the output torque determination unit 64, into a current signal and sends the current signal to the electric motor 18.

In the above configuration, the lift control lever control input sensor 55, tilt control lever control input sensor 56, attachment control lever control input sensor 57, steering control speed sensor 58, and controller 60 constitute setting means for setting the command rotation rate of the electric motor 18 and determining means for determining whether the descent control of the up-and-down control means 11 is performed singly or the controls of the plurality of manual control means including the descent control of the up-and-down control means 11 are performed simultaneously. The controller 60 constitutes electric motor controlling means for controlling the electric motor 18, based on the command rotation rate set by the setting means and the actual rotation rate detected by the rotation rate detecting means 59.

The controller 60 constitutes valve opening and closing controlling means for controlling the solenoid-controlled directional control valve 53 as follows: when the determining means determines that the descent control of the up-and-down control means 11 is performed singly, the valve opening and closing controlling means controls the solenoid-controlled directional control valve 53 so as to be switched to the open position 53*a* if the difference between the command rotation rate of the electric motor 18 set by the setting means and the actual rotation rate of the electric motor 18 detected by the rotation rate detecting means is not less than the predetermined value; when the determining means determines that the controls of the plurality of manual control means including the descent control of the up-and-down control means 11 are performed simultaneously, the valve opening and closing controlling means controls the solenoid-controlled directional control valve 53 so as to be switched to the open position 53*a*.

The controller 60 constitutes torque limit controlling means operating as follows: when the determining means determines that the descent control of the up-and-down control means 11 is performed singly, the torque limit controlling means imposes a limit on the power drive torque of the electric motor 18; when the determining means determines that the controls of the plurality of manual control means including the descent control of the up-and-down control means 11 are performed simultaneously, the torque limit controlling means removes the limit on the power drive torque of the electric motor 18.

The processes in S101 and S102 shown in FIG. 4 function as a part of the determining means. The processes in S101 and S103 to S105 function as a part of the setting means. The process in S106 functions as the torque limit controlling means. The process in S107 functions as the valve opening and closing controlling means. The process in S109 functions as the electric motor controlling means.

Figure 8:
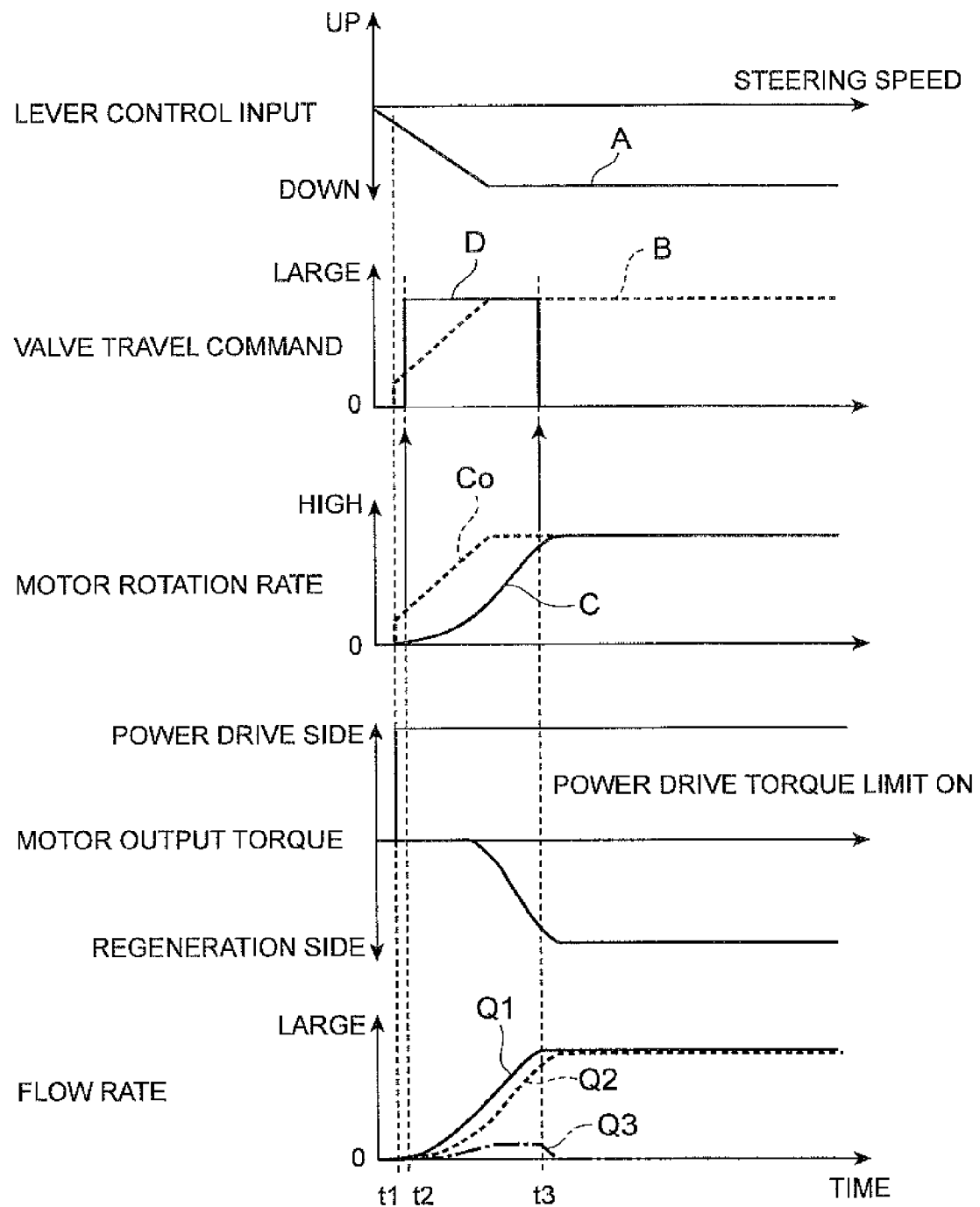
FIG. 8 is a drawing showing a timing chart in execution of a lift descent single control, in a large cargo load state (or high load state).

Next, the operation of the hydraulic drive device 16 of the present embodiment will be described with reference to FIGS. 8 to 11. FIG. 8 is a drawing showing a timing chart in the case where the lift descent single control is carried out in a large cargo load state (high load state).

In FIG. 8, the lift descent single control is started first at time t1 to turn the power drive torque limit of the electric motor 18 ON. Furthermore, the lift descent solenoid current command value (cf. dashed line B) depending upon the control input of the lift control lever 11 (cf. solid line A) is obtained and the current command value is output to the solenoid-controlled proportional valve 48. Then, the solenoid-controlled proportional valve 48 is switched from the close position 48*b* to the open position 48*a*. At this time, since the cargo load is large, the pressure difference between pressures upstream and downstream of the solenoid-controlled proportional valve 48 becomes large and the pressure compensation valve 50 is switched from the open position 50*a* to the close position 50*b*. Then the lift necessary motor rotation rate according to the lift descent solenoid current command value is obtained as a motor command rotation rate (cf. dashed line $C_O$) and the motor command rotation rate is output to the electric motor 18.

At time t2, when the difference between the motor command rotation rate and the motor actual rotation rate (cf. solid line C) becomes not less than the constant value N, the solenoid-controlled directional control valve 53 turns ON (cf. solid line D). At this time, the hydraulic pump motor 17 is rotated by intake pressure of the hydraulic pump motor 17, whereby the motor actual rotation rate becomes closer to the motor command rotation rate.

At time t3, the difference between the motor command rotation rate and the motor actual rotation rate becomes smaller than the constant value N and thus the solenoid-controlled directional control valve 53 turns OFF (cf. solid line D). Then, the flow rate Q3 of the hydraulic oil returning to the tank 19 (bypass flow rate) becomes zero and the flow rate Q1 of the hydraulic oil from the lift cylinder 4 comes to be the flow rate Q2 of the hydraulic oil supplied to the hydraulic pump motor 17. Therefore, the hydraulic pump motor 17 becomes likely to operate as a hydraulic motor and the electric motor 18 functions as an electric generator. This allows the hydraulic drive device to efficiently perform the aforementioned cargo-handling regeneration.

Figure 9:
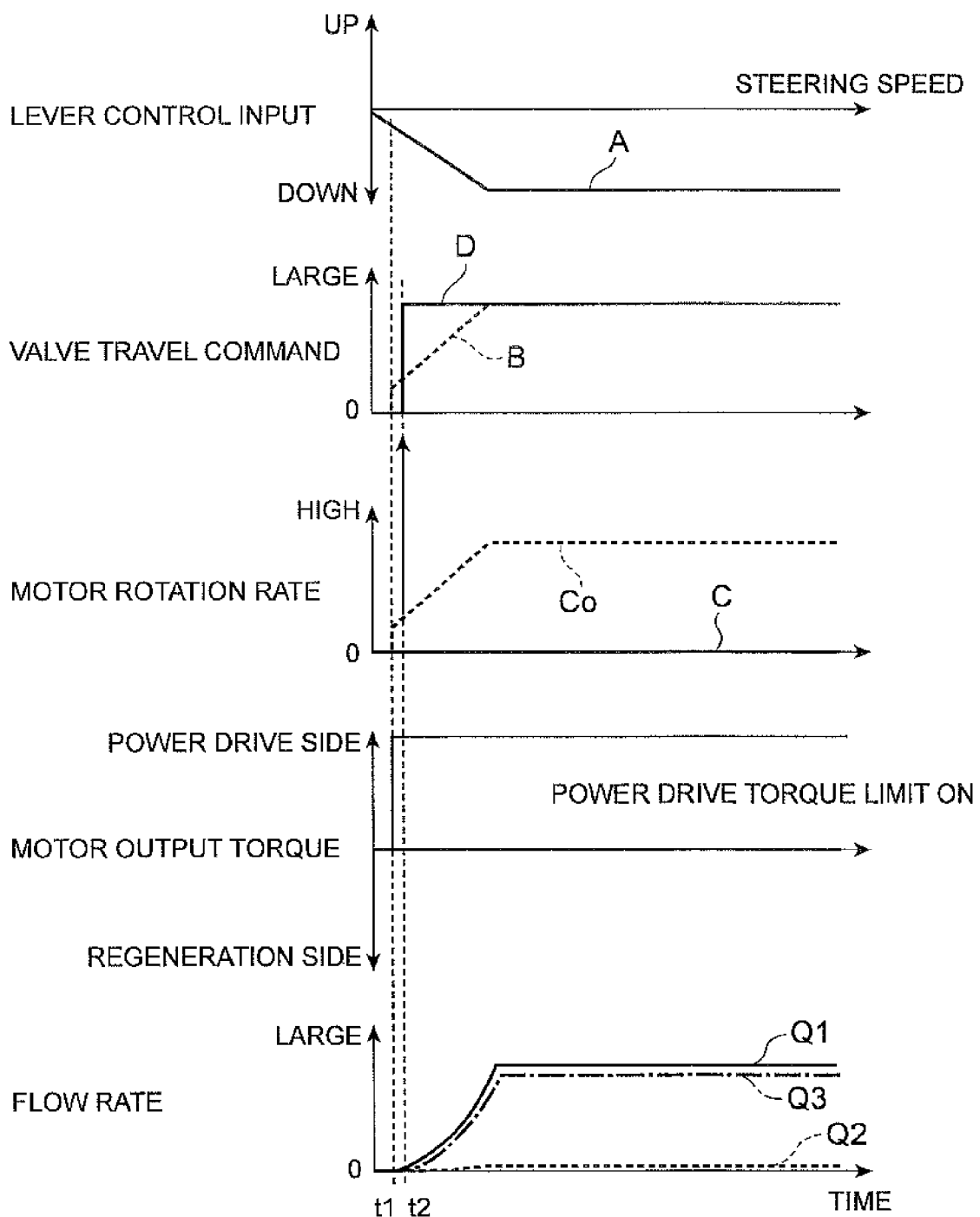
FIG. 9 is a drawing showing a timing chart in execution of the lift descent single control, in a small cargo load state (or low load state).

FIG. 9 is a drawing showing a timing chart in the case where the lift descent single control is carried out in a small cargo load state (low load state).

In FIG. 9, the lift descent single control is started first at time t1 and thus the power drive torque limit of the electric motor 18 turns ON. Furthermore, the lift descent solenoid current command value (cf. dashed line B) depending upon the control input of the lift control lever 11 (cf. solid line A) is obtained and the current command value is output to the solenoid-controlled proportional valve 48. Then, the solenoid-controlled proportional valve 48 is switched from the close position 48b to the open position 48a. At this time, since the cargo load is small, the pressure difference between pressures upstream and downstream of the solenoid-controlled proportional valve 48 is small and thus the pressure compensation valve 50 is open. Then, the lift necessary motor rotation rate according to the lift descent solenoid current command value is obtained as a motor command rotation rate (cf. dashed line $C_0$) and the motor command rotation rate is output to the electric motor 18.

At time t2, when the difference between the motor command rotation rate and the motor actual rotation rate (cf. solid line C) becomes not less than the constant value N, the solenoid-controlled directional control valve 53 turns ON (cf. solid line D). Since at this time the intake pressure of the hydraulic pump motor 17 is low, the hydraulic pump motor 17 is not rotated and the motor actual rotation rate does not reach the motor command rotation rate. For this reason, the solenoid-controlled directional control valve 53 is maintained in the ON state.

In that state, the valve travel of the pressure compensation valve 50 increases until the bypass flow rate Q3 of the hydraulic oil returning to the tank 19 reaches a necessary flow. Then, the flow rate Q1 of the hydraulic oil from the lift cylinder 4 is ensured by a degree of necessity. This ensures a necessary lift descent speed. In addition, the electric motor 18 is inhibited from undergoing power drive, which can keep the power consumption low.

Figure 10:
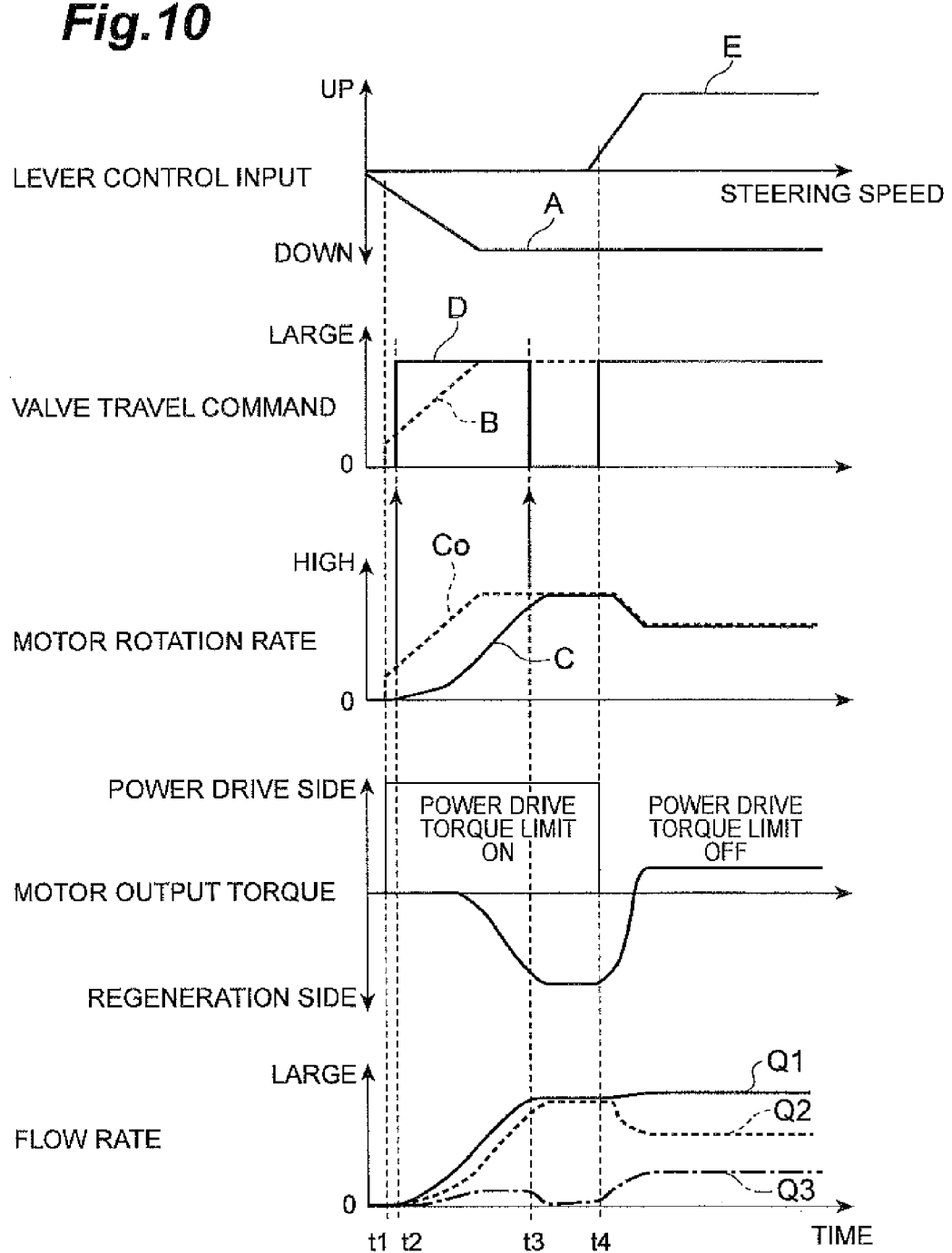
FIG. 10 is a drawing showing a timing chart in execution of simultaneous controls of lift descent and tilt, in the large cargo load state (high load state).

FIG. 10 is a drawing showing a timing chart in the case where the controls of lift descent and tilt are performed simultaneously, in the large cargo load state (high load state). Since the operations at times t1 to t3 in FIG. 10 are the same as those shown in FIG. 8, the description thereof is omitted herein.

At time t4, the tilt control is started, so as to turn the power drive torque limit of the electric motor 18 OFF and turn the solenoid-controlled directional control valve 53 from OFF to ON (cf. solid line D). Then, a tilt solenoid current command value depending upon a control input of the tilt control lever 12 (cf. solid line E) is obtained and the current command value is output to the solenoid-controlled proportional valve 26. Then, the solenoid-controlled proportional valve 26 is switched from the close position 26c to either of the open positions 26a, 26b. Then, the tilt necessary motor rotation rate according to the tilt solenoid current command value is obtained as a motor command rotation rate (cf. dashed line $C_0$) and the motor command rotation rate is output to the electric motor 18.

Since the power drive torque limit of the electric motor 18 is OFF, the motor actual rotation rate follows the motor command rotation rate. The cargo-handling regeneration can be implemented depending upon the cargo load.

Since the motor command rotation rate is lowered from the lift necessary motor rotation rate to the tilt necessary motor rotation rate, the motor actual rotation rate becomes decreased. Since the decrease of the motor actual rotation rate leads to decrease in the flow rate Q2 of the hydraulic oil supplied to the hydraulic pump motor 17, the pressure compensation valve 50 comes to open to a valve travel enough to compensate for the decrease of flow rate Q2. Therefore, the bypass flow rate Q3 of the hydraulic oil returning to the tank 19 increases and thus the flow rate Q1 of the hydraulic oil from the lift cylinder 4 becomes nearly constant. By this, the lift descent speed can be kept constant even in execution of the simultaneous controls of lift descent and tilt. In addition, the lift descent operation and the tilt operation can be simultaneously carried out by making maximum use of regenerative energy of the cargo.

Figure 11:
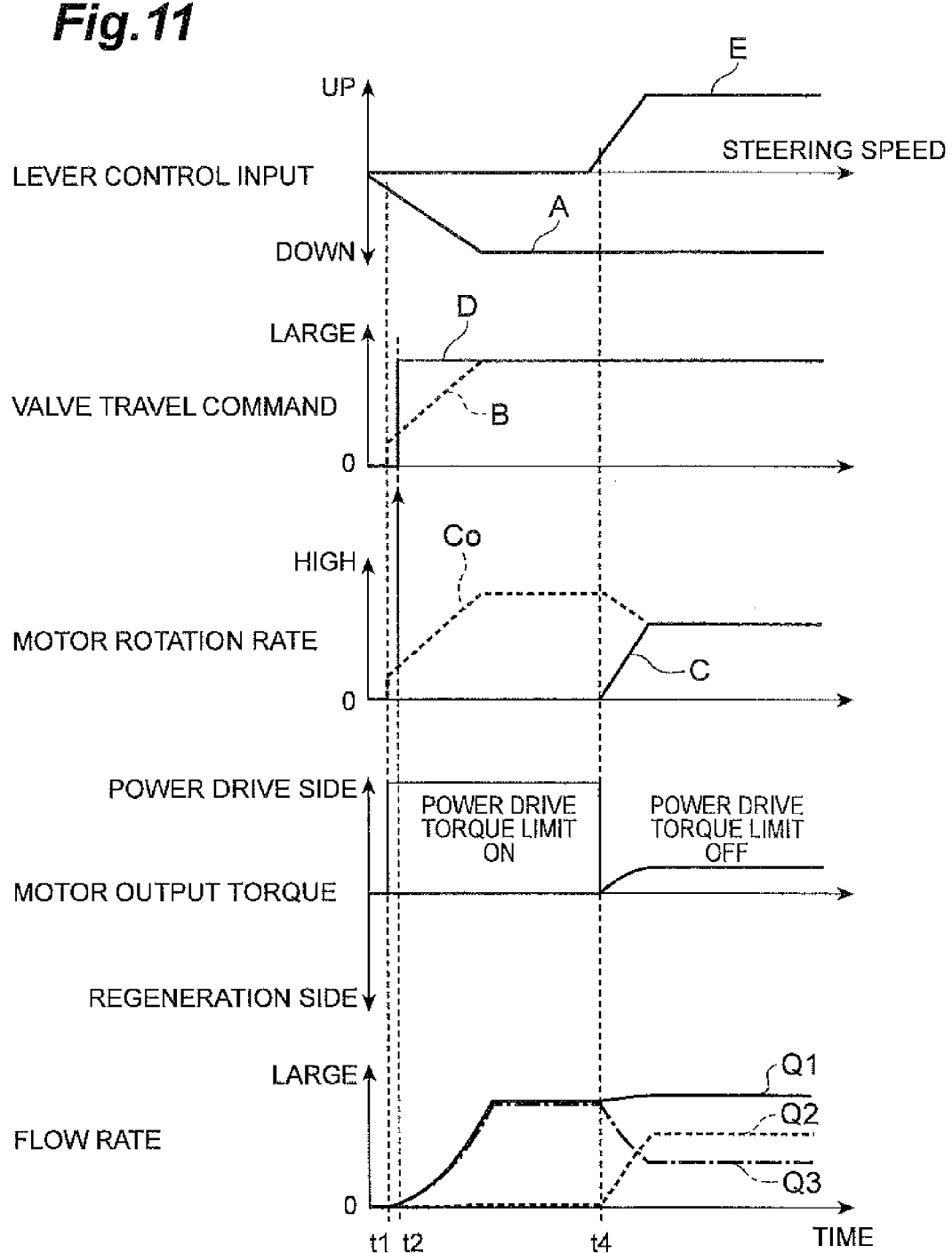
FIG. 11 is a drawing showing a timing chart in execution of simultaneous controls of lift descent and tilt, in the small cargo load state (low load state).

FIG. 11 is a drawing showing a timing chart in the case where the controls of lift descent and tilt are performed simultaneously, in the small cargo load state (low load state). Since the operations at times t1 and t2 in FIG. 11 are the same as those shown in FIG. 9, the description thereof is omitted herein.

At time t4, the tilt control is started, so as to turn the power drive torque limit of the electric motor 18 OFF and maintain the solenoid-controlled directional control valve 53 in the ON state (cf. solid line D). Furthermore, the tilt solenoid current command value depending upon the control input of the tilt control lever 12 is obtained and the current command value is output to the solenoid-controlled proportional valve 26. Then, the solenoid-controlled proportional valve 26 is switched from the close position 26c to either of the open positions 26a, 26b. In addition, the tilt necessary motor rotation rate according to the tilt solenoid current command value is obtained as a motor command rotation rate (cf. dashed line $C_0$) and the motor command rotation rate is output to the electric motor 18.

Since the power drive torque limit of the electric motor 18 is OFF, the motor actual rotation rate follows the motor command rotation rate. The cargo-handling regeneration can be implemented depending upon the cargo load.

Since the motor actual rotation rate does not reach the motor command rotation rate before the time t4, the motor actual rotation rate increases (cf. solid line C). Since the increase of the motor actual rotation rate leads to increase in the flow rate Q2 of the hydraulic oil supplied to the hydraulic pump motor 17, the valve travel of the pressure compensation valve 50 becomes smaller to decrease the bypass flow rate Q3 of the hydraulic oil returning to the tank 19 by the increase of flow rate Q2. Therefore, the flow rate Q1 of the hydraulic oil from the lift cylinder 4 becomes substantially constant. By this, the lift descent speed can be kept constant even in execution of the simultaneous controls of lift descent and tilt.

The operations in the cases of execution of the simultaneous controls of lift descent and attachment and the simultaneous controls of lift descent and tilt are almost the same as the operation in execution of the simultaneous controls of lift descent and tilt. The simultaneous controls are not limited only to situations in which the lift control lever and, another control lever or the steering wheel are controlled at the same timing. For example, the simultaneous controls also include situations in which another control lever or the steering wheel is controlled in a state in which the lift control lever has been controlled. Namely, the simultaneous controls also include situations in which another control lever or the steering wheel is controlled in a state in which the lift cylinder 4 has operated based on a control of the lift control lever.

According to the present embodiment, as described above, the whole flow rate of the hydraulic oil from the lift cylinder 4 is fed to the hydraulic pump motor 17 during the lift descent single operation in the case of the cargo load being enough to implement the cargo-handling regeneration. This allows the cargo-handling regeneration to be implemented with high efficiency. During the lift descent single operation in the case of the cargo load being light, most of the flow rate of the hydraulic oil from the lift cylinder 4 returns to the tank 19. This ensures the necessary lift descent speed with necessary minimum power.

During the lift descent single operation, even if the cargo is one with a load capable of implementing the cargo-handling regeneration at low lift descent speed, the pressure of the hydraulic oil will be lowered to pressure incapable of implementing the regeneration at high lift descent speed. In this case, however, most of the flow rate of the hydraulic oil from the lift cylinder 4 returns to the tank 19, which prevents the electric motor 18 from undergoing power drive. Therefore, it can reduce power consumption.

Even in the case where another cargo-handling operation, such as tilt and attachment, or the steering operation is performed during the lift descent operation, a part of the flow rate of the hydraulic oil from the lift cylinder 4 returns to the tank 19, which can suppress variation of lift descent speed. Since the other cargo-handling operation or the steering operation can be performed by making maximum use of regenerative energy of the cargo, depending upon the cargo load and the control input of the control lever, power consumption can be reduced.

When the lift descent operation overlaps with the other cargo-handling operation or the steering operation, the controller 60 sets the necessary motor rotation rate other than the lift necessary motor rotation rate, as the motor command rotation rate even if the lift necessary motor rotation rate is higher than the tilt necessary motor rotation rate, the attachment necessary motor rotation rate, and the power steering necessary motor rotation rate. This prevents the hydraulic oil from being supplied more than necessary to the tilt cylinders 9, the attachment cylinder 15, and the PS cylinder 14. As a result, increase of loss can be prevented.

The pressure compensation valve 50 keeps change of lift descent speed small, even with variation in the pressure difference between pressures upstream and downstream of the solenoid-controlled proportional valve 48. Therefore, it can suppress variation in lift descent speed due to variation of cargo load.

The controller 60 performs the determination on ON or OFF of the solenoid-controlled directional control valve 53, based on whether the difference between the motor command rotation rate and the motor actual rotation rate is not less than the constant value N. This configuration requires neither of a pressure sensor and a stroke sensor, or the like. Furthermore, there is no need for provision of a plurality of hydraulic pump motors 17 and electric motors 18. Therefore, the hydraulic drive device 16 can be constructed at low cost.

Figure 12:
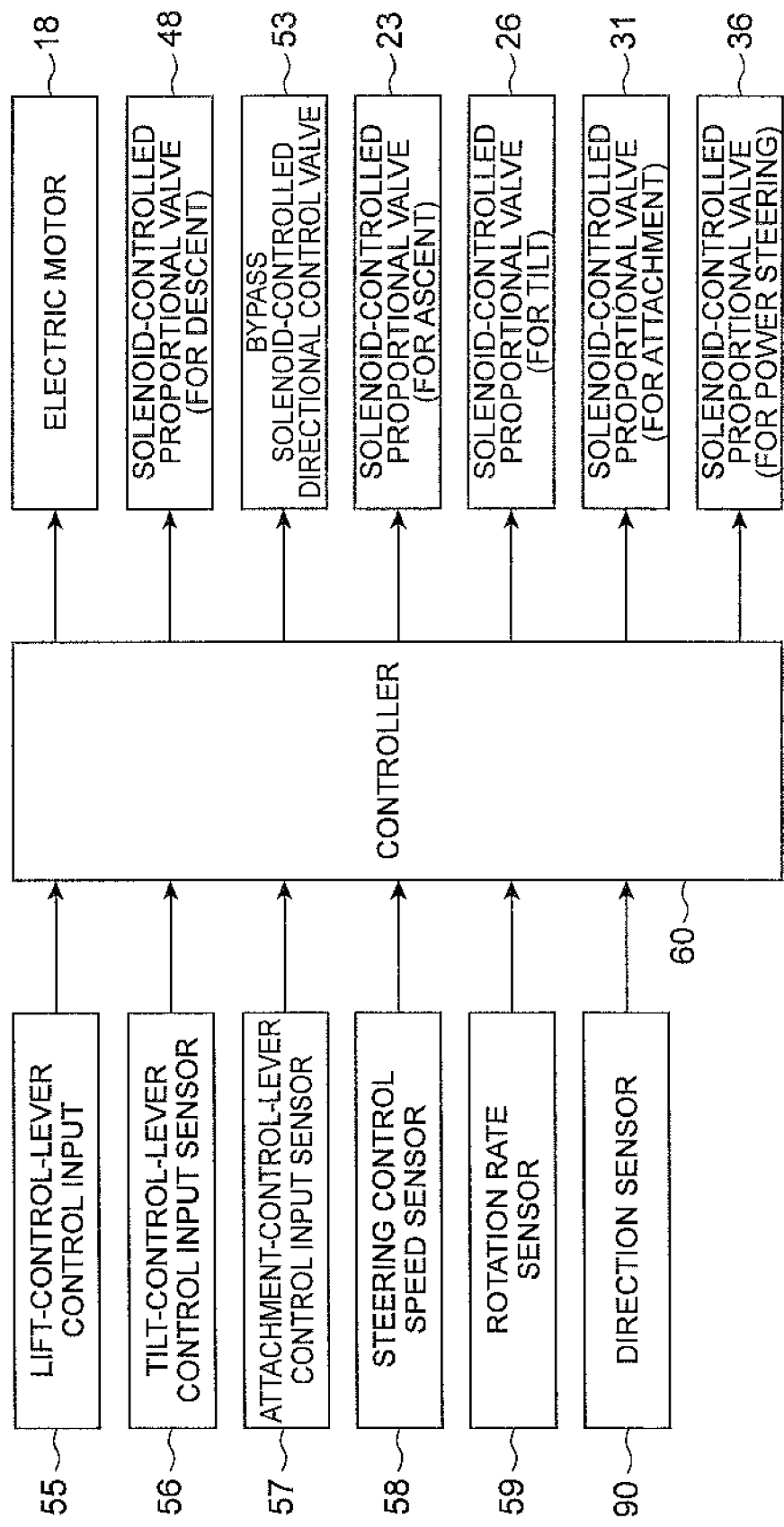
FIG. 12 is a configuration diagram showing a control system of the hydraulic drive device according to the second embodiment.

FIG. 12 is a configuration diagram showing a control system of the hydraulic drive device according to the second embodiment. In the same drawing, the hydraulic drive device 16 of the present embodiment is further equipped with a direction sensor (running direction detecting means) 90, in addition to the configuration shown in FIG. 3.

The direction sensor 90 detects a running direction (forward, backward, or neutral) of the forklift 1 selected through the direction switch (described above). When the direction switch is switched to forward or backward, the direction sensor 90 turns ON. When the direction switch is switched to neutral, the direction sensor 90 turns OFF.

The controller 60 receives the detected values from the control lever control input sensors 55-57, the steering control speed sensor 58, and the rotation rate sensor 59 and the detection signal from the direction sensor 90, and performs predetermined processing to control the electric motor 18, the solenoid-controlled proportional valves 23, 26, 31, 36, 48, and the solenoid-controlled directional control valve 53. The controller 60 executes the control processes of operations including the lift descent, in accordance with the processes in S101 to S109 shown in FIG. 4. The processes in S101 to S104 are the same as in the aforementioned first embodiment.

The motor command rotation rate (motor rotation rate command value) set by the process in S105 is as shown in FIG. 13. Specifically, when the direction sensor 90 is OFF, the motor command rotation rates for all the lift descent modes are the same as in the above first embodiment. When the direction sensor 90 is ON, the controller 60 sets a maximum of lift necessary motor rotation rate N_lift and PS idle rotation rate N_psi as the motor command rotation rate in the case of lift descent single control. The PS idle rotation rate N_psi is preliminarily determined by experiment or the like. When the direction sensor is ON, the motor command rotation rates in the cases of the other lift descent modes are the same as in the above first embodiment.

Figure 14:
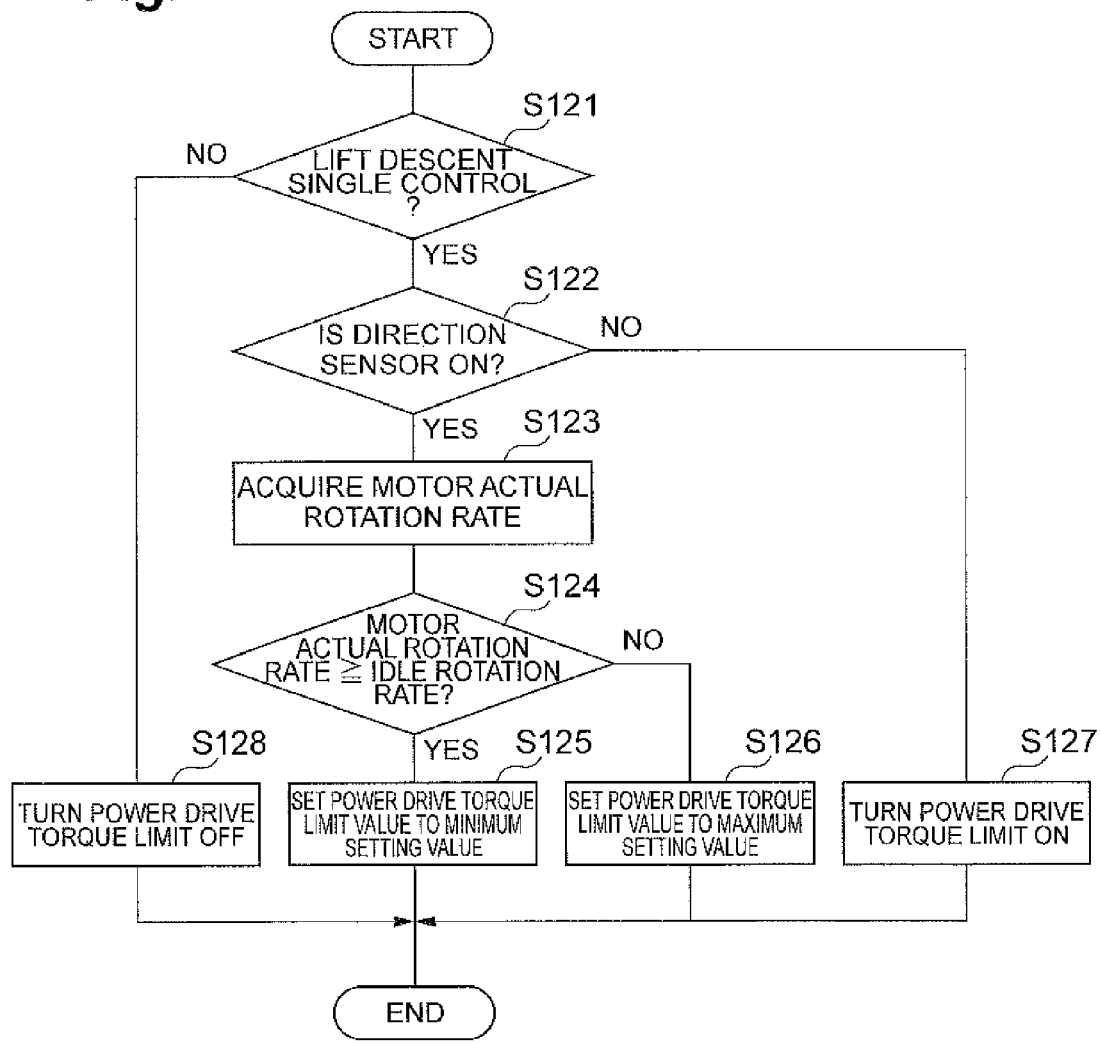
FIG. 14 is a flowchart showing the details of a power drive torque limit value setting process procedure shown in FIG. 4, performed by the controller shown in FIG. 12.

The power drive torque limit value of the electric motor 18 set by the process in S106 is set by two-valued control, as shown in FIG. 13. FIG. 14 shows the details of the setting process procedure of the power drive torque limit value of the electric motor 18.

In FIG. 14, the controller 60 first determines whether the lift descent mode is the lift descent single control (S121). When determining that the lift descent mode is the lift descent single control, the controller 60 determines whether the direction sensor 90 is ON (S122). When determining that the direction sensor 90 is ON, the controller 60 acquires the motor actual rotation rate detected by the rotation rate sensor 59 (S123).

Subsequently, the controller 60 determines whether the motor actual rotation rate is not less than the idle rotation rate (S124). When determining that the motor actual rotation rate is not less than the idle rotation rate, the controller 60 sets the power drive torque limit value of the electric motor 18 to a minimum setting value $S_L$ (cf. FIG. 15) (S125). At this time, the minimum setting value $S_L$ (first setting value) is, for example, a value (torque) that maintains the rotation rate of the hydraulic pump motor 17 at the idle rotation rate even if the oil temperature of the hydraulic oil is significantly high. The minimum setting value $S_L$ is a value obtained by experiment or the like.

When determining that the motor actual rotation rate is less than the idle rotation rate, the controller 60 sets the power drive torque limit value of the electric motor 18 to a maximum setting value $S_U$ (cf. FIG. 15) (S126). At this time the maximum setting value $S_U$ (second setting value) is a value larger than the minimum setting value $S_L$. The maximum setting value $S_U$ is a value obtained by experiment or the like. The maximum setting value $S_U$ is, for example, a value (torque) that is necessary for rotating the hydraulic pump motor 17 at the idle rotation rate even if the oil temperature of the hydraulic oil is significantly low.

When determining by the process in S122 that the direction sensor 90 is not ON but OFF, the controller 60 turns the power drive torque limit to ON as in the above first embodiment (S127). When determining by the process in S121 that the lift descent mode is not the lift descent single control, the controller 60 turns the power drive torque limit to OFF as in the first embodiment (S128).

Figure 15:
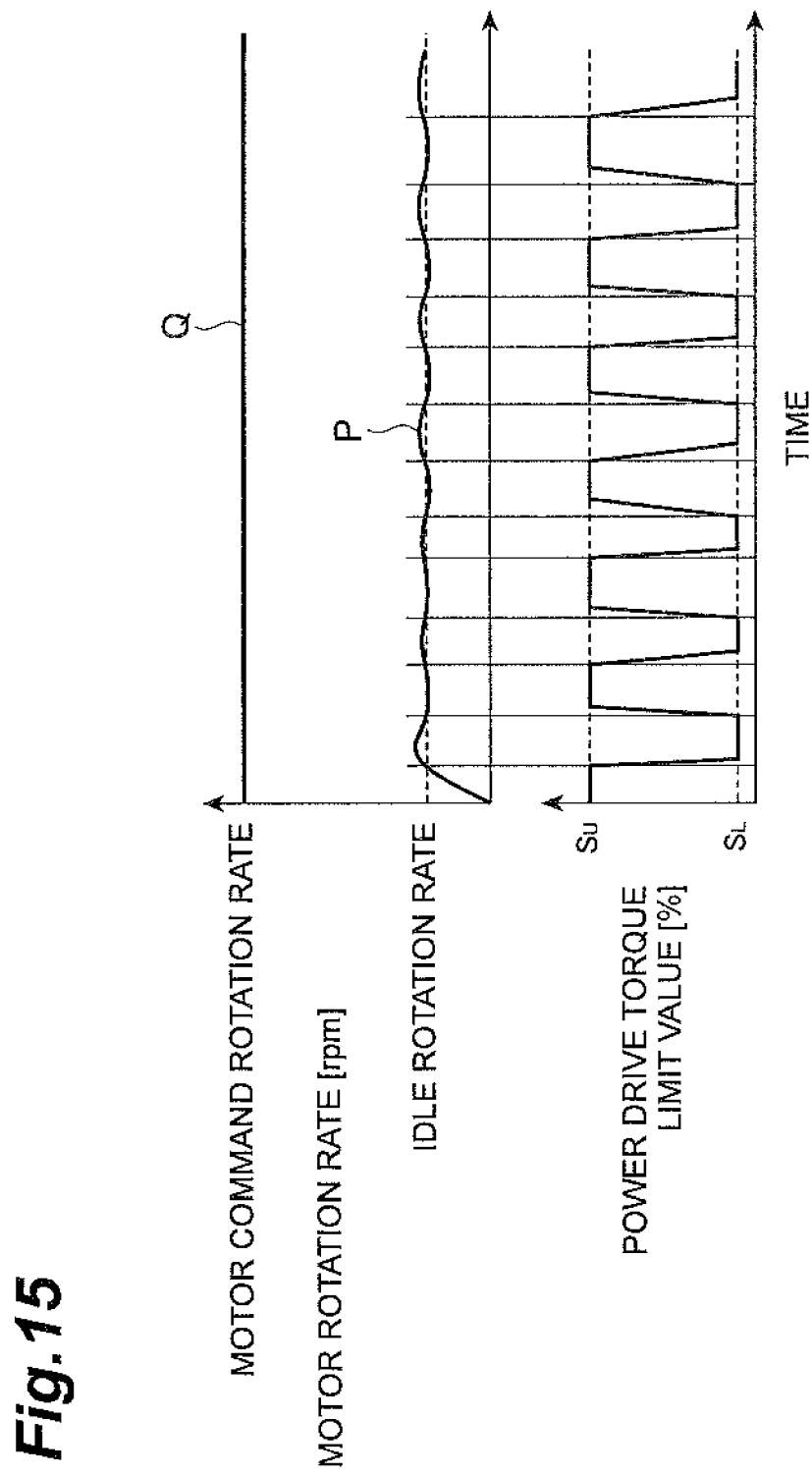
FIG. 15 is a drawing showing a time chart of rotation rate and power drive torque limit value of an electric motor in execution of the power drive torque limit value setting process procedure shown in FIG. 14.

In the present process, when the motor actual rotation rate is not less than the idle rotation rate, the power drive torque limit value of the electric motor 18 is set to the minimum setting value $S_L$. This reduces the power drive torque permitted by the electric motor 18. When the motor actual rotation rate is less than the idle rotation rate, the power drive torque limit value of the electric motor 18 is set to the maximum setting value $S_U$. This increases the power drive torque permitted by the electric motor 18. Therefore, as shown in FIG. 15, the motor actual rotation rate P becomes closer to the idle rotation rate, in a situation in which the motor actual rotation rate P cannot follow the motor command rotation rate Q, e.g., in the low load state in which the cargo load is light.

The processes in S107 to S109 are the same as in the first embodiment.

The process in S127 shown in FIG. 14 functions as first power drive torque limit value setting means for setting the power drive torque limit value of the electric motor 18 to the predetermined value when the determining means determines that the descent control of the up-and-down control means is performed singly, in a state in which the running direction detecting means 90 detects the running direction of the cargo handling vehicle 1 being neutral. The processes in S123 to S126 function as second power drive torque limit value setting means for setting the power drive torque limit value of the electric motor 18, based on the actual rotation rate detected by the rotation rate detecting means 59 and based on the idle rotation rate of the hydraulic pump 17 or the target rotation rate corresponding to the rotation rate higher than the idle rotation rate, when the determining means determines that the descent control of the up-and-down control means is performed singly, in a state in which the running direction detecting means 90 detects the running direction of the cargo handling vehicle 1 being forward or backward.

When the direction switch (described above) is in the forward or backward state, the hydraulic pump motor 17 needs to be rotated at a rotation rate not less than the idle rotation rate, in preparation for handling (steering) of the steering wheel of the steering mechanism 13. Incidentally, as the oil temperature of the hydraulic oil becomes lower, the viscosity of the hydraulic oil increases and the pressure loss increases. This increases the power drive torque necessary for rotating the hydraulic pump motor 17 at a rotation rate not less than the idle rotation rate. Therefore, the power drive torque limit value needs to be set so as to ensure the rotation rate of the hydraulic pump motor 17 not less than the idle rotation rate at low oil temperatures of the hydraulic oil. In this case, however, the hydraulic pump motor 17 permits a large power drive torque even at ordinary oil temperatures of the hydraulic oil and, for this reason, the rotation rate of the hydraulic pump motor 17 rises more than necessary, resulting in increase of power consumption.

In contrast to it, the present embodiment is configured so that when the lift descent single operation is performed with the direction switch being in the forward or backward state, the controller 60 compares the motor actual rotation rate with the idle rotation rate and sets the power drive torque limit value of the electric motor 18 to the minimum setting value $S_L$ or the maximum setting value $S_U$ according to the result of the comparison. Therefore, the rotation rate of the hydraulic pump motor 17 becomes closer to the idle rotation rate, irrespective of the oil temperature of the hydraulic oil. This allows smooth steering during the lift descent single operation.

Since the hydraulic pump motor 17 rotates at the necessary minimum rotation rate close to the idle rotation rate in the light cargo load state, increase of power consumption is suppressed. Since the hydraulic pump motor 17 rotates at the motor command rotation rate higher than the idle rotation rate in the sufficiently heavy cargo load state, cargo-handling regeneration is implemented with high efficiency.

Figure 16:
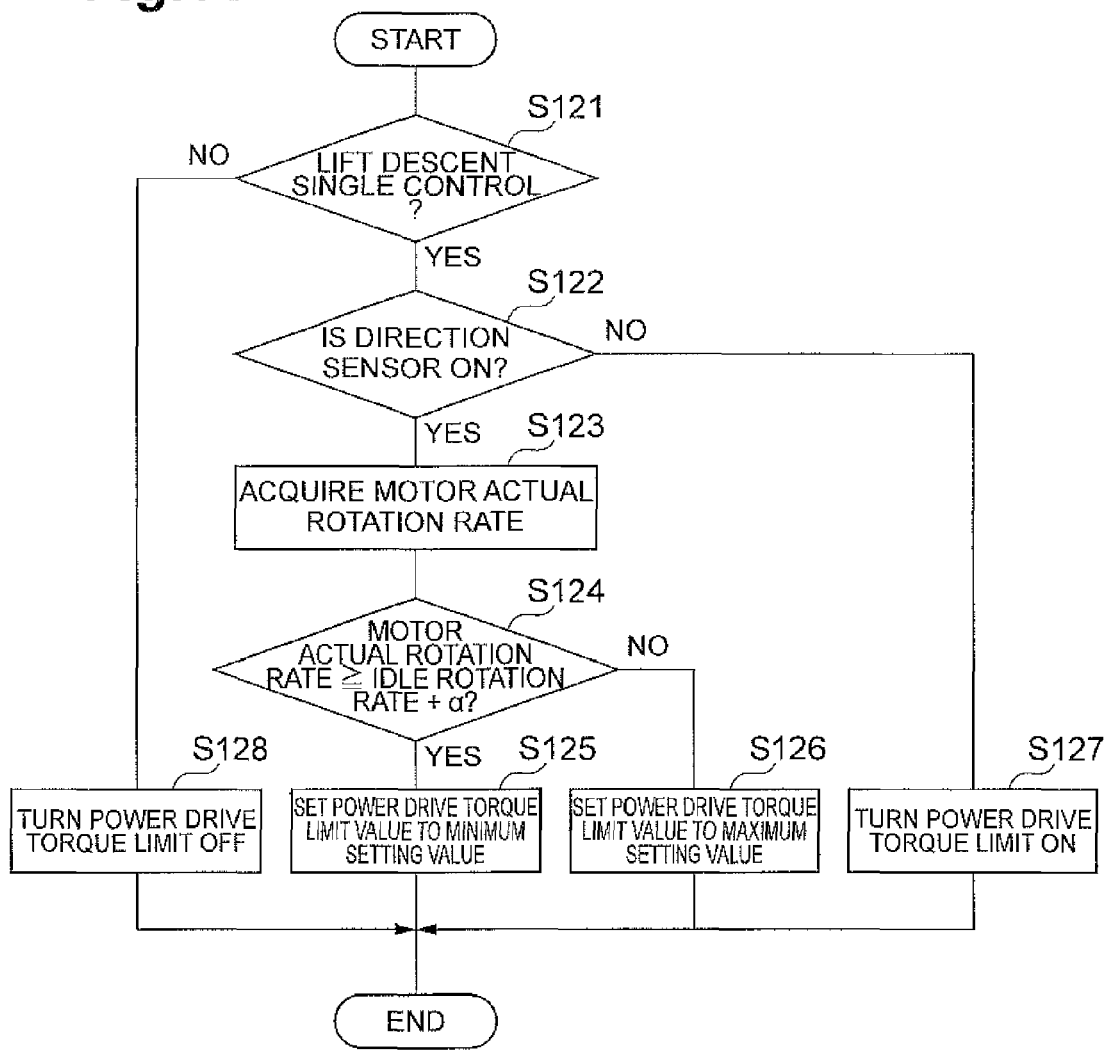
FIG. 16 is a flowchart showing a modification example of the power drive torque limit value setting process procedure shown in FIG. 14.

FIG. 16 is a flowchart showing a modification example of the power drive torque limit value setting process procedure shown in FIG. 14. The present flowchart is different only in the process in S124 from the flowchart shown in FIG. 14.

By the process in S124, the controller 60 determines whether the motor actual rotation rate is not less than a threshold rotation rate (the idle rotation rate+α herein). α is a constant rotation rate determined in advance. When determining that the motor actual rotation rate is not less than the foregoing threshold rotation rate (idle rotation rate+α), the controller 60 sets the power drive torque limit value of the electric motor 18 to the minimum setting value $S_L$ (cf. FIG. 17) (S125). When determining that the motor actual rotation rate is less than the foregoing threshold rotation rate (idle rotation rate+α), the controller 60 sets the power drive torque limit value of the electric motor 18 to the maximum setting value $S_U$ (cf. FIG. 17) (S126).

Figure 17:
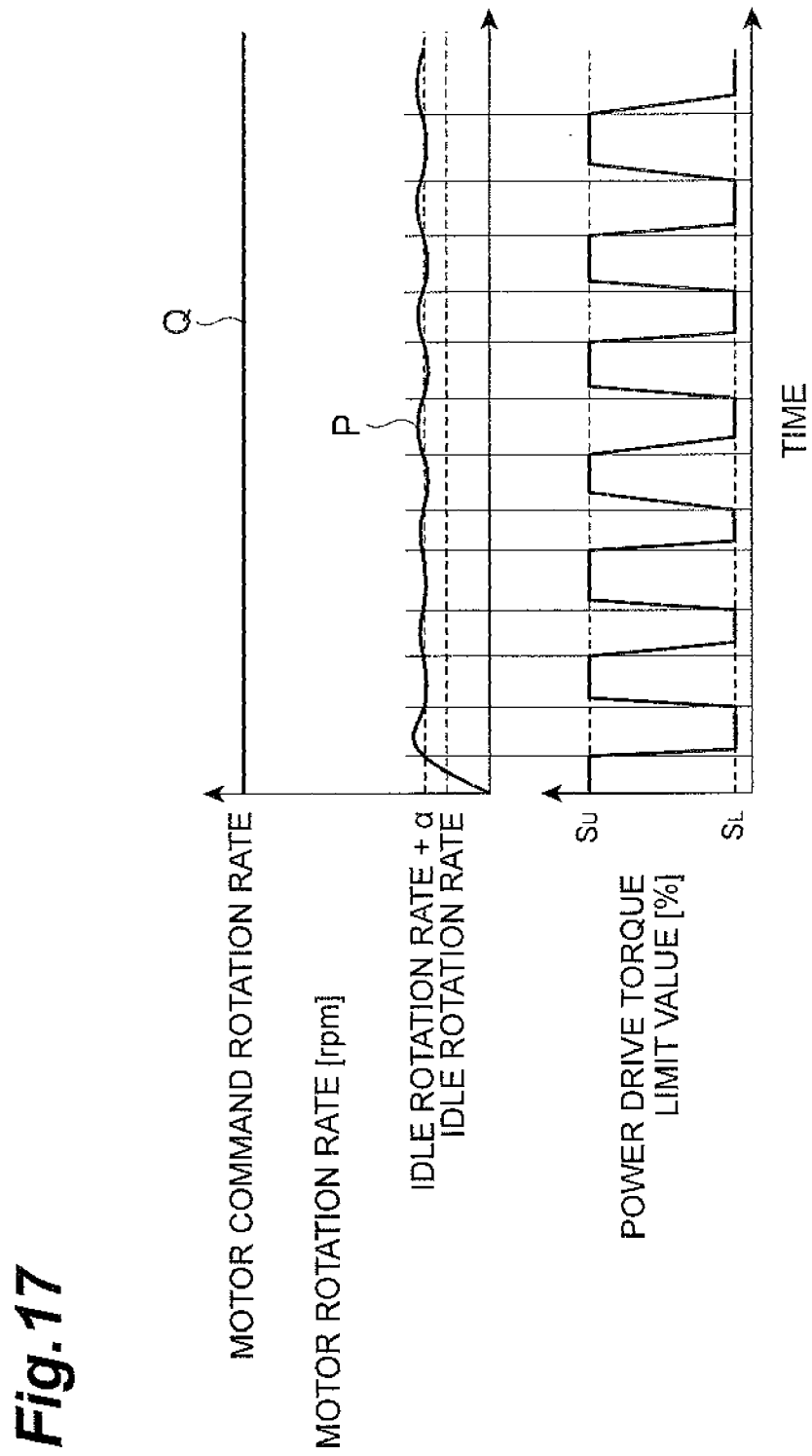
FIG. 17 is a drawing showing a time chart of rotation rate and power drive torque limit value of the electric motor in execution of the power drive torque limit value setting process procedure shown in FIG. 16.

In the present modification example, the threshold rotation rate for switching of the power drive torque limit value is set to the idle rotation rate+α. As shown in FIG. 17, the motor actual rotation rate P becomes closer to the threshold rotation rate (idle rotation rate+α) being the target rotation rate in the situation in which the motor actual rotation rate P cannot follow the motor command rotation rate Q. This ensures that the rotation rate of the hydraulic pump motor 17 is certainly kept not less than the idle rotation rate, even with some pulsation of the motor actual rotation rate P near the idle rotation rate.

FIG. 18 is a block diagram showing a configuration of a part of the controller 60 in the hydraulic drive device according to the third embodiment. The present embodiment is different only in the process in S106 in the flowchart shown in FIG. 4 from the second embodiment. The process in S106 is executed by torque limit value setting unit 80 included in the controller 60. FIG. 18 is a drawing corresponding only to the process in the case where the direction sensor 90 is ON and where the lift descent mode is the lift descent single control. The processes except for the process in the case where the direction sensor 90 is ON and where the lift descent mode is the lift descent single control are the same as in the above second embodiment (cf. FIG. 19).

The torque limit value setting unit 80 has a comparison unit 81 and a PID operation unit 82. The comparison unit 81 calculates a rotation rate deviation between the aforementioned idle rotation rate and the motor actual rotation rate detected by the rotation rate sensor 59. The PID operation unit 82 performs the PID operation of the rotation rate deviation between the idle rotation rate and the motor actual rotation rate to obtain the power drive torque limit value of the electric motor 18 to make the rotation rate deviation zero. The power drive torque limit value is sent to the output torque determination unit 64 of the motor torque output unit 61 which executes the process in S109 shown in FIG. 4.

The torque limit value setting unit 80 constitutes second power drive torque limit value setting means for setting the power drive torque limit value of the electric motor 18, based on the actual rotation rate detected by the rotation rate detecting means 59 and based on the idle rotation rate of the hydraulic pump motor 17 or the target rotation rate corresponding to the rotation rate higher than the idle rotation rate, when the determining means determines that the descent control of the up-and-down control means is performed singly, in the state in which the running direction detecting means 90 detects the running direction of the cargo handling vehicle 1 being forward or backward.

Figure 20:
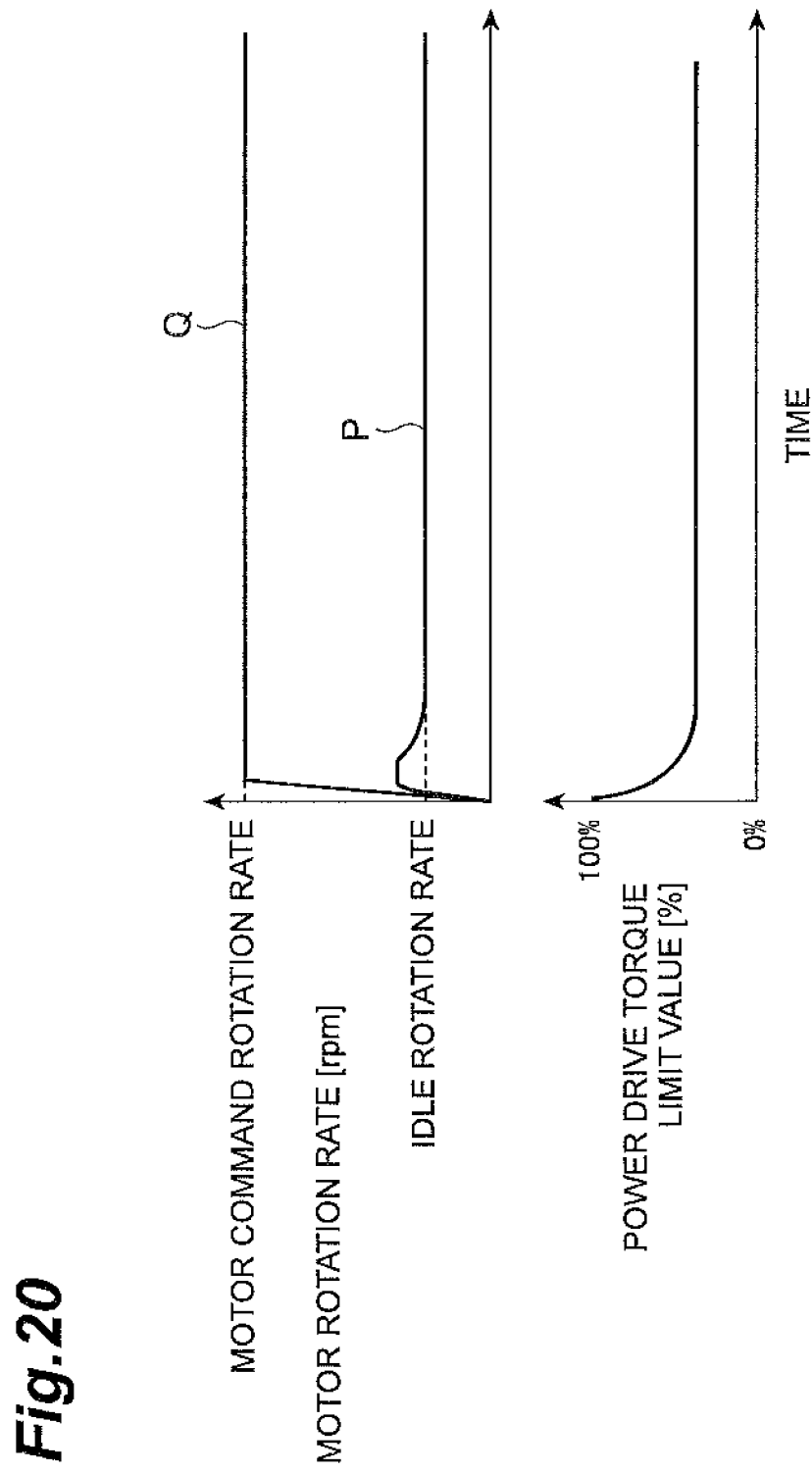
FIG. 20 is a drawing showing a time chart of rotation rate and power drive torque limit value of the electric motor with the power drive torque limit value being set by a torque limit value setting unit shown in FIG. 18.

In the present embodiment, when the lift descent single operation is carried out with the direction switch being in the forward or backward state, the controller 60 sets the power drive torque limit value of the electric motor 18 by the PID control. By this, as shown in FIG. 20, in the state in which the motor actual rotation rate P cannot follow the motor command rotation rate Q, the motor actual rotation rate P undergoes little pulsation around the idle rotation rate and the motor actual rotation rate P smoothly and stably follows the idle rotation rate. Therefore, the rotation rate of the hydraulic pump motor 17 can be maintained at the idle rotation rate, irrespective of the oil temperature of the hydraulic oil. As a consequence of this, smooth steering can be performed during the lift descent single operation. In the light cargo load state, the hydraulic pump motor 17 rotates at the necessary minimum rotation rate being the idle rotation rate and, for this reason, increase of power consumption is suppressed.

The present embodiment adopts the PID control for the power drive torque limit value of the electric motor 18, but the present invention does not have to be limited to this example. It is sufficient that feedback control such as PI control be performed so as to make the rotation rate deviation between the idle rotation rate and the motor actual rotation rate zero.

The above described some embodiments of the hydraulic drive devices for cargo handling vehicle according to the present invention, but it is noted that the present invention is not limited solely to the above embodiments.

Figure 21:
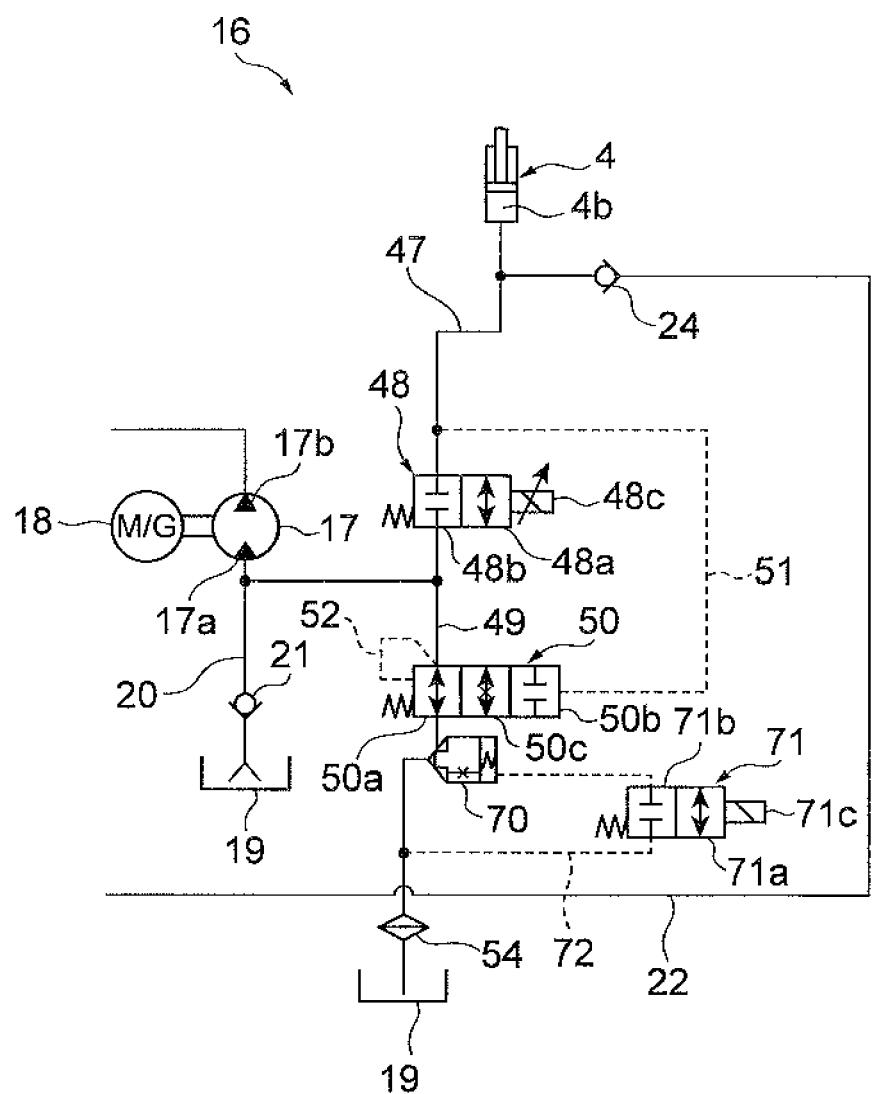
FIG. 21 is a hydraulic circuit diagram showing a modification example of the bypass solenoid-controlled directional control valve shown in FIG. 2.

The above embodiments used the bypass solenoid-controlled directional control valve 53, but there is no need to be limited to this example. Instead of the solenoid-controlled directional control valve 53, a lift lock valve 70 and a pilot solenoid-controlled directional control valve 71 may be used as shown in FIG. 21. The lift lock valve 70 is disposed between the pressure compensation valve 50 and the tank 19 on the hydraulic pipe 49. The pilot solenoid-controlled directional control valve 71 is disposed on a pilot flow passage 72. The pilot flow passage 72 is connected to the lift lock valve 70 and to a downstream point (on the tank 19 side) of the lift lock valve 70.

The pilot solenoid-controlled directional control valve 71 is switched between an open position 71*a* and a close position 71*b*. The pilot solenoid-controlled directional control valve 71 is normally at the close position 71*b* (as shown). While the pilot solenoid-controlled directional control valve 71 is at the close position 71*b*, the lift lock valve 70 is closed. When an ON signal is supplied to a solenoid control unit 71*c* of the pilot solenoid-controlled directional control valve 71, the pilot solenoid-controlled directional control valve 71 is switched to the open position 71*a*. This opens the lift lock valve 70.

When the lift lock valve 70 and the pilot solenoid-controlled directional control valve 71 are used as valve means, the opening and closing control of the oil passage between the pressure compensation valve 50 and the tank 19 can be implemented with a small flow rate. This achieves downsizing and lowers the drive power.

The above embodiments are equipped with the attachment and the power steering mechanism, but the hydraulic drive devices of the present invention can also be applied to forklifts without the attachment and the power steering. The hydraulic drive devices of the present invention are applicable to any battery-powered cargo handling vehicles other than the forklifts.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A hydraulic drive device for a cargo handling vehicle provided with a plurality of hydraulic cylinders including an up-and-down hydraulic cylinder for moving an object up and down with supply and discharge of hydraulic oil, and a plurality of manual control members including an up-and-down control lever configured so as to actuate the up-and-down hydraulic cylinder, the hydraulic drive device comprising:
   a tank reserving the hydraulic oil;
   a hydraulic pump having an inlet port for drawing in the hydraulic oil and an outlet port for discharging the hydraulic oil;
   an electric motor for driving the hydraulic pump;
   a first oil passage connecting the tank and the inlet port;
   a second oil passage connecting the outlet port and the plurality of hydraulic cylinders;
   a third oil passage branching off from the first oil passage and connecting the first oil passage and a bottom chamber of the up-and-down hydraulic cylinder;
   a solenoid-controlled proportional valve disposed on the third oil passage and configured to open with a valve travel depending upon a control input of a descent control of the up-and-down control lever;
   a pressure compensation valve disposed between a branch portion of the third oil passage and the tank on the first oil passage and configured to open with a valve travel depending upon a pressure difference between pressures upstream and downstream of the solenoid-controlled proportional valve on the third oil passage;
   a directional control valve disposed between the pressure compensation valve and the tank on the first oil passage and configured to be switched between an open position and a close position,
   wherein, while the descent control of the up-and-down control lever is performed, the directional control valve is configured to be placed in the open position, unless the descent control of the up-and-down control lever is performed singly and a difference between a command rotation rate and an actual rotation rate of the electric motor is less than a predetermined value; and
   a controller configured to control the solenoid-controlled proportional valve and the directional control valve.

2. The hydraulic drive device for the cargo handling vehicle according to claim 1, further comprising:
   a rotation rate sensor for detecting the actual rotation rate of the electric motor;

a first control input sensor for detecting a control input of the up-and-down control lever; and a second control input sensor for detecting a control input of the manual control member other than the up-and-down control lever, wherein the controller is configured as follows:

based on the control inputs detected by the first and second control input sensors, the controller determines whether the descent control of the up-and-down control lever is performed singly or controls of the plurality of manual control members including the descent control of the up-and-down control lever are performed simultaneously;

when determining that the descent control of the up-and-down control lever is performed singly, the controller sets the command rotation rate depending upon the control input detected by the first control input sensor;

when determining that the controls of the plurality of manual control members including the descent control of the up-and-down control lever are performed simultaneously, the controller sets the command rotation rate depending upon the control input detected by the second control input sensor; and the controller controls the electric motor, based on the command rotation rate thus set and the actual rotation rate detected by the rotation rate sensor.

3. The hydraulic drive device for the cargo handling vehicle according to claim 2, wherein the controller is configured to control the directional control valve as follows:

when determining that the descent control of the up-and-down control lever is performed singly, the controller controls the directional control valve so as to be switched to the open position if the difference between the set command rotation rate and the actual rotation rate detected by the rotation rate sensor is not less than the predetermined value, and the controller controls the directional control valve so as to be switched to the close position if the difference between the command rotation rate and the actual rotation rate detected by the rotation rate sensor is less than the predetermined value;

when determining that the controls of the plurality of manual control members including the descent control of the up-and-down control lever are performed simultaneously, the controller controls the directional control valve so as to be switched to the open position.

4. The hydraulic drive device for the cargo handling vehicle according to claim 2, wherein the controller is further configured to control the electric motor as follows:

when determining that the descent control of the up-and-down control lever is performed singly, the controller imposes a limit on a power drive torque of the electric motor; and when determining that the controls of the plurality of manual control members including the descent control of the up-and-down control lever are performed simultaneously, the controller removes the limit on the power drive torque of the electric motor.

5. The hydraulic drive device for the cargo handling vehicle according to claim 4, further comprising:

a direction sensor for detecting a running direction of the cargo handling vehicle, wherein the controller is further configured as follows:

the controller sets a power drive torque limit value of the electric motor to a predetermined value when determining that the descent control of the up-and-down control lever is performed singly, in a state in which the direction sensor detects the running direction of the cargo handling vehicle being neutral; and the controller sets the power drive torque limit value of the electric motor to a first setting value or a second setting value, based on an idle rotation rate of the hydraulic pump or a target rotation rate corresponding to a rotation rate higher than the idle rotation rate and based on the actual rotation rate detected by the rotation rate sensor, when determining that the descent control of the up-and-down control lever is performed singly, in a state in which the direction sensor detects the running direction of the cargo handling vehicle being forward or backward.

6. The hydraulic drive device for the cargo handling vehicle according to claim 5, wherein the controller is further configured as follows:

when determining that the actual rotation rate detected by the rotation rate sensor is not less than the target rotation rate, the controller sets the power drive torque limit value of the electric motor to the first setting value; and when determining that the actual rotation rate is less than the target rotation rate, the controller sets the power drive torque limit value of the electric motor to the second setting value larger than the first setting value.

7. The hydraulic drive device for the cargo handling vehicle according to claim 5, wherein the controller calculates a rotation rate deviation between the target rotation rate and the actual rotation rate detected by the rotation rate sensor and sets the power drive torque limit value of the electric motor so as to make the rotation rate deviation zero.

* * * * *